United States Patent
Mande et al.

(10) Patent No.: US 12,354,428 B2
(45) Date of Patent: *Jul. 8, 2025

(54) UNIVERSAL REMOVEABLE CASSETTE ARRAY WITH CASH REBALANCING

(71) Applicant: Wells Fargo Bank, N.A., San Francisco, CA (US)

(72) Inventors: Christian Mande, Charlotte, NC (US); Darren Goetz, Salinas, CA (US); Frank Digangi, San Francisco, CA (US); Dennis E. Montenegro, Concord, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/396,015

(22) Filed: Dec. 26, 2023

(65) Prior Publication Data

US 2024/0135769 A1     Apr. 25, 2024

Related U.S. Application Data

(63) Continuation of application No. 17/402,902, filed on Aug. 16, 2021, now Pat. No. 11,900,753.

(51) Int. Cl.
*G07D 11/23* (2019.01)
*G06Q 40/02* (2023.01)
(Continued)

(52) U.S. Cl.
CPC ............ *G07D 11/36* (2019.01); *G06Q 40/02* (2013.01); *G07D 11/125* (2019.01); *G07D 11/23* (2019.01);
(Continued)

(58) Field of Classification Search
CPC ...... G07D 11/36; G07D 11/125; G07D 11/23; G07D 11/25; G07D 11/30; G07D 11/60;
(Continued)

(56) References Cited

U.S. PATENT DOCUMENTS

| | | |
|---|---|---|
| 6,014,649 A | 1/2000 | Kobayashi et al. |
| 6,427,998 B1 | 8/2002 | Norrie et al. |

(Continued)

FOREIGN PATENT DOCUMENTS

| | | | | |
|---|---|---|---|---|
| EP | 3032506 A1 | * | 6/2016 | ............. B65H 1/266 |
| EP | 3547273 A1 | * | 10/2019 | ............. G07D 11/18 |

(Continued)

OTHER PUBLICATIONS

Bati, Seyma et al, Joint optimization of cash management and routing for new-generation automated teller machine networks (2017).

*Primary Examiner* — Tuyen K Vo
(74) *Attorney, Agent, or Firm* — Foley & Lardner LLP

(57) ABSTRACT

A universal cassette housing for storing banknotes includes a first docking element structured to receive a first universal cassette, a second docking element structured to receive a second universal cassette, a transport apparatus structured to facilitate transferring banknotes between the first universal cassette and the second universal cassette, and a housing computing system comprising a processing circuit including one or more processors and memory, the memory storing instructions that, when executed by the one or more processors, cause the housing computing system to receive information regarding banknotes stored in the first universal cassette, receive information regarding banknotes stored in the second universal cassette, and cause the transport apparatus to initiate a transfer of one or more of the banknotes based on the information regarding the banknotes stored in (Continued)

the first universal cassette and the information regarding the banknotes stored in the second universal cassette.

20 Claims, 10 Drawing Sheets

(51) Int. Cl.
  *G07D 11/125* (2019.01)
  *G07D 11/25* (2019.01)
  *G07D 11/30* (2019.01)
  *G07D 11/36* (2019.01)
  *G07D 11/60* (2019.01)
  *G07F 19/00* (2006.01)
(52) U.S. Cl.
  CPC ............. *G07D 11/25* (2019.01); *G07D 11/30* (2019.01); *G07D 11/60* (2019.01); *G07F 19/205* (2013.01); *G07D 2211/00* (2013.01); *G07F 19/209* (2013.01)
(58) Field of Classification Search
  CPC .. G07D 2211/00; G06Q 40/02; G07F 19/205; G07F 19/209
  See application file for complete search history.

(56) References Cited

U.S. PATENT DOCUMENTS

| | | |
|---|---|---|
| 6,540,136 B1 | 4/2003 | Ross |
| 7,591,413 B1 | 9/2009 | Block et al. |
| 8,019,663 B1 | 9/2011 | Bohen et al. |
| 8,127,983 B1 | 3/2012 | Block et al. |
| 8,505,814 B1 | 8/2013 | Block et al. |
| 9,016,682 B2 | 4/2015 | Law et al. |
| 9,299,206 B2 | 3/2016 | Angus et al. |
| 9,311,674 B2 | 4/2016 | Angus et al. |
| 9,761,091 B2 | 9/2017 | Turocy et al. |
| 9,865,118 B2 | 1/2018 | Angus |
| 9,905,084 B2 | 2/2018 | Beskitt et al. |
| 10,410,479 B2 | 9/2019 | Beskitt et al. |
| 10,504,083 B2 | 12/2019 | Forsyth |
| 10,565,832 B2 | 2/2020 | Vankirk et al. |
| 11,741,774 B1 | 8/2023 | Mande et al. |
| 11,900,753 B1 | 2/2024 | Mande et al. |
| 2010/0025183 A1 | 2/2010 | Folk et al. |
| 2010/0025911 A1 | 2/2010 | Sakamoto |
| 2010/0230231 A1 | 9/2010 | Uesaka et al. |
| 2012/0295682 A1 | 11/2012 | Schwartz |
| 2013/0186729 A1 | 7/2013 | Miksic et al. |
| 2015/0325073 A1* | 11/2015 | Sasaki ..................... G07D 9/00 700/241 |
| 2020/0184781 A1 | 6/2020 | Vankirk et al. |
| 2022/0301399 A1 | 9/2022 | Namura et al. |

FOREIGN PATENT DOCUMENTS

| | | |
|---|---|---|
| WO | WO-2004/001650 A1 | 12/2003 |
| WO | WO-2004/077365 A2 | 9/2004 |
| WO | WO-2011/138408 A1 | 11/2011 |
| WO | WO-2015/082346 A1 | 6/2015 |
| WO | WO-2016/055760 A1 | 4/2016 |
| WO | WO-2016/061678 A1 | 4/2016 |
| WO | WO-2016/132120 A1 | 8/2016 |

* cited by examiner

UNIVERSAL REMOVEABLE CASSETTE ARRAY WITH CASH REBALANCING

CROSS-REFERENCE TO RELATED APPLICATION

This application is a continuation of U.S. patent application Ser. No. 17/402,902, filed Aug. 16, 2021, which is hereby incorporated by reference in its entirety and for all purposes.

BACKGROUND

Bill handling machines, such as automated teller machines (ATMs) or cash recycling units at teller stations (e.g., at a financial institution), often utilize cassettes to store bills (e.g., currency, bank notes, etc.). Each of the series of cassettes can be configured to store a particular denomination or type of bill, and may be structured to receive or dispense bills in response to a transaction. An ATM user may withdraw bills from the ATM by entering account information, a bank card, an amount to withdraw, etc., and the ATM may retrieve appropriate bills from one or more cassettes. A teller operating a teller station may deposit bills into the teller station, and these bills may be routed into appropriate cassettes. Further, cash cassettes can generally be placed anywhere inside a branch (e.g. at the teller line and at sales platform desks) and can be utilized by tellers, bankers and even customers.

The cassettes utilized by ATMs, teller stations, point-of-sale (POS) systems, etc., may be unique to the particular model or type of device, and therefore may not be compatible with other styles, models, or types of devices. A cassette used in a particular model of ATM may not be compatible with a teller station, or vice versa, and/or the cassettes may lack smart programmable functionality or features.

SUMMARY

One embodiment of the present disclosure is a removable universal cassette housing that includes a first docking element, a second docking element, a transport apparatus, and a housing computing system. The first docking element is structured to receive a first universal cassette. The first universal cassette is structured to retrievably store a first quantity of banknotes. The second docking element is structured to receive a second universal cassette. The second universal cassette is structured to retrievably store a second quantity of banknotes. The transport apparatus is structured to facilitate transferring one or more banknotes between the first universal cassette and the second universal cassette. The housing computing system includes a processing circuit including at least one processor and a memory, the memory storing instructions that, when executed by the at least one processor, cause the housing computing system to perform operations. The operations include generating a first storage data packet responsive to the first universal cassette docking with the first docking element. The first storage data packet includes information about banknotes stored in the first universal cassette. The operations also include generating a second storage data packet responsive to the second universal cassette docking with the second docking element. The second storage data packet includes information about banknotes stored in the second universal cassette. The operations also include generating a rebalancing instruction based on at least one of the first storage data packet and the second storage data packet. The rebalancing instruction is related to a first set of banknotes to transfer from the first universal cassette to the second universal cassette and a second set of banknotes to transfer from the second universal cassette to the first universal cassette. The operations also include causing the transport apparatus to initiate a transfer based on the rebalancing instruction. The operations also include, in response to completing the transfer, generating a notification indicating that the transfer is completed.

Another embodiment of the present disclosure is a method of rebalancing banknotes in a transaction system. The method includes docking a first universal cassette with a first docking element of a universal cassette housing. The first universal cassette is structured to retrievably store a first quantity of banknotes. The removable universal cassette housing is removable. The method also includes docking a second universal cassette with a second docking element of the removable universal cassette housing. The second universal cassette is structured to retrievably store a second quantity of banknotes. The method also includes generating, by a housing computing system, a first storage data packet comprising information about banknotes stored in the first universal cassette. The method also includes generating, by the housing computing system, a second storage data packet comprising information about the banknotes stored in the second universal cassette. The method also includes generating, by the housing computing system, a rebalancing instruction generated based on at least one of the first storage data packet and the second storage data packet. The rebalancing instruction is related to a first set of banknotes to transfer from the first universal cassette to the second universal cassette and a second set of banknotes to transfer from the second universal cassette to the first universal cassette. The method also includes causing, by the housing computing system, a transport apparatus to initiate a transfer based on the rebalancing instruction. The method also includes in response to completing the transfer, generating a notification indicating that the transfer is completed.

Yet another embodiment of the present disclosure relates to one or more memory devices having instructions stored thereon that, when executed by one or more processors, cause the one or more processors to perform operations. The operations include communicatively coupling a computing system (e.g., a housing computing system) to a first universal cassette responsive to the first universal cassette docking with a first docking element of a housing. The first universal cassette is structured to retrievably store a first quantity of banknotes. The operations also include communicatively coupling the computing system to a second universal cassette responsive to the second universal cassette docking with a second docking element of the removable universal cassette housing. The second universal cassette is structured to retrievably store a second quantity of banknotes. The operations also include generating a first storage data packet. The first storage data packet includes information about banknotes stored in the first universal cassette including a number of banknotes stored in the first universal cassette. The operations also include generating a second storage data packet. The second storage data packet includes information about banknotes stored in the second universal cassette including a number of banknotes stored in the second universal cassette. The operations also include generating a rebalancing instruction. The rebalancing instruction is based on at least one of the first storage data packet and the second storage data packet. The rebalancing instruction is related to a first set of banknotes to transfer from the first universal cassette to the second universal cassette and a second set of banknotes to transfer from the second universal cassette to the first universal cassette. The operations also include causing a transport apparatus of the removable universal cassette housing to initiate a transfer based on the rebalancing instruction. The operations also include in response to completing the transfer, transmitting a notification to the remote computing system.

This summary is illustrative only and is not intended to be limiting in any way. Other aspects, inventive features, and advantages of the devices or processes described herein will become apparent in the detailed description set forth herein, taken in conjunction with the accompanying figures, wherein like numerals refer to like elements.

BRIEF DESCRIPTION OF THE DRAWINGS

Objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
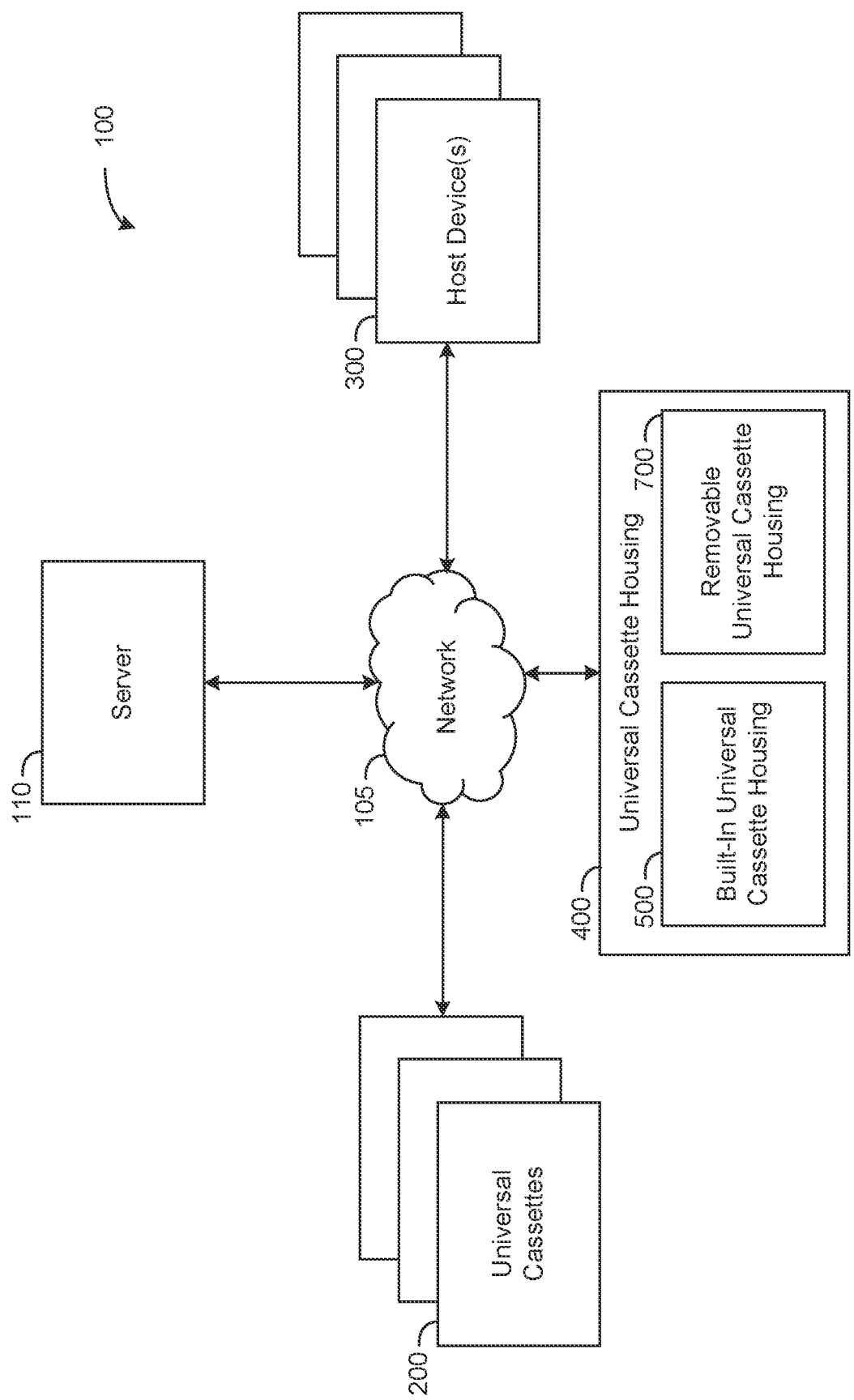
FIG. 1 is a block diagram of a cassette management system, according to an example arrangement.

Referring generally to the figures, a universal cassette housing for performing a rebalancing operation on universal cassettes is disclosed. The universal cassettes structured for receiving and dispensing bills and a cassette management system are shown, according to various embodiments. In particular, the universal cassettes described herein may be docked (i.e., installed, disposed within, and/or communicatively coupled to) in various host devices or systems, including various models or types of automated teller machines (ATMs), teller stations such as teller counters at banks, kiosks, cash recyclers, point of sale (POS) systems, etc. In other words, these cassettes may be "universal" in that they may be configured to function with a variety of systems.

A universal cassette can include a control circuit, which may be embodied within the cassette in whole or in part (e.g., as an integrated circuit, a system on a chip (SOC), a removable card, etc.). The control circuit can include one or more sensors for detecting bill quality, fill level, location, and various other parameters associated with operations of the universal cassette. The universal cassette can be docked into a host device, such as an ATM, to facilitate the storage and retrieval of bills over one or more transactions. The universal cassette may be communicatively and/or electronically coupled to the host device, and the universal cassette and/or the host device may be communicatively coupled to a central computing system (e.g., a remote server), such as a financial institution server.

Together, the universal cassettes, host devices, and central computing system may form a cassette management system, capable of tracking fill levels, denominations, locations, and other information for one or more cassettes. In one example, a branch of a financial institution (e.g., a bank branch) may include at least one ATM and/or at least one teller station with a cash storage system configured to receive or dispense bills to a teller and/or a customer. Over time, the number of bills contained in the multiple cassettes of the ATM or the teller's station may gradually deplete as customers make withdrawals. In a similar manner, cassettes at the ATM or teller's station may fill over time, as customers make deposits. The filling and depletion of these cassettes may be tracked by the central computing system based on information provided by the cassettes themselves (e.g., via circuitry, including at least one of a fill sensor, processor, and memory), by the docking station (e.g., via circuitry, including at least one of a fill sensor, processor, and memory), and/or by at least one sensor positioned in the bill path. The information may include information regarding a cassette being full (e.g., the cassette which has filled over time) or empty (e.g., the cassette which as depleted over time), and the central computing system may identify a replacement cassette. In this example, the central computing system may determine that the empty ATM cassette may be replaced by the full teller station cassette or vice versa.

Upon determining that a first cassette requires replacement, the central computing system may identify, based on a current location of the first cassette, a denomination associated with the first cassette, and/or one or more other attributes of the first cassette, and a second, replacement cassette. In the example above, the central computing system may determine that the ATM cassette is nearly empty, and may identify the teller station's cassette as a suitable replacement based on the proximity of the two cassettes (e.g., both the ATM and the teller station being geographically located within a predetermined distance). The central computing system may generate a notification that is presented to a user (e.g., a bank employee) via a user device, such as a desktop computer or mobile device, which provides instructions for the user to swap the first and second cassettes, or at least to replace the first cassette with the second cassette. The user may then remove the first cassette from its host device and replace it with the second cassette.

In some arrangements, the cassette management system may include a specialized universal cassette housing that is structured to receive the universal cassettes via one or more docking apparatuses. In some arrangements, the universal cassette housing is provided within the host device. In some arrangements, the universal cassette housing is a stand-alone device. The universal cassette housing may include a computing system that is operable to communicatively couple to the control circuit of the universal cassette(s), the host device computing system, and/or the central computing system. The universal cassette housing may be structured to facilitate rebalancing banknotes stored by the universal cassette(s). For example, the central computing system may identify (e.g., based on information provided by the universal cassettes via the host device and/or the universal cassette housing) when a first cassette is full and a second cassette is empty. In some arrangements, the universal cassette housing may be structured to receive a plurality of cassettes and can rebalance the plurality of cassettes concurrently, partially concurrently, or sequentially. For example, each of the plurality of cassettes may have a different fill level (e.g., one or more empty cassettes, one or more almost empty cassettes, one or more moderately filled cassettes, one or more almost filled cassettes, and/or one or more full cassettes). The universal cassette housing may be structured to determine, based on the fill level, a rebalancing operation such that the fill level of each of the plurality of cassettes docked with the universal cassette housing is substantially the same (e.g., all cassettes are moderately filled). In some arrangements, the universal cassette housing may provide fill level data to the central computing system, and the central computing system may provide instructions to the universal cassette housing to transfer at least a portion of the bills stored by the first cassette from the first cassette to the second cassette.

Referring first to FIG. 1, a block diagram of a cassette management system 100 is shown, according to an example arrangement. As described briefly above, system 100 may be configured to track and/or manage a plurality of universal cassettes, such as by determining when one or more cassettes are full, near full, near empty, or empty, and subsequently identifying appropriate replacement cassettes or cassette swaps and/or rebalancing the bills stored among two or more cassettes. In some embodiments, system 100 is implemented at a single location (e.g., a particular branch of a financial institution), although in other embodiments, system 100 may be implemented across multiple locations (e.g., across multiple branches belonging to the same parent company). For example, system 100 may be implemented to manage cassettes across all of the locations (e.g., branches) of a company within a geographical area, region, etc.

As shown, the system 100 includes a network 105, a computing system, shown as server 110, universal cassette (s) 200, transaction devices shown as host device(s) 300, and a universal cassette housing 400. As shown, the universal cassette housing 400 may be a built-in universal cassette housing 500 or a removable universal cassette housing 700. In some arrangements, the system 100 may include one or more universal cassette housings 400 (e.g., any combination of built-in universal cassette housing(s) 500 and/or removable universal cassette housings 700). In some arrangements, the system 100 includes only one of the built-in universal cassette housing and the removable universal cassette housing. In some arrangements, a built-in universal cassette housing 500 is provided within and/or permanently fixed to one or more of the host devices 300. In some arrangements, the removable universal cassette housing 500 is a stand-alone device. In some arrangements, the removable universal cassette housing 500 is removably coupled to one or more of the host devices 300. Accordingly, as described herein below, arrangements related to the universal cassette housing 400 may be applicable to either or both arrangements related to the built-in universal cassette housing 500 and/or the removable universal cassette housing 700.

As shown, each of the server 110, the universal cassettes 200, the host devices 300, and the universal cassette housing 400, may be communicatively coupled to the network 105 such that the network permits the direct or indirect exchange of data, values, instructions, messages, and the like (represented by the double-headed arrows in FIG. 1). In some arrangements, the network 105 is configured to communicatively couple to additional computing system(s). For example, the network 105 may facilitate communication of data between the server 110 and other computing systems associated with a business that operates the host devices 300 or with a customer of the business. The network 105 may include one or more of a cellular network, the Internet, Wi-Fi, Wi-Max, a proprietary provider network, a proprietary retail or service provider network, and/or any other kind of wireless or wired network. Specifically, the network 105 may be wired or wireless network (e.g., Internet, intranet, VPN, etc.) configured to exchange data, values, instructions, messages, and the like between the components of system 100. Accordingly, each of the server 110, the universal cassettes 200, the host devices 300, and the universal cassette housing 400 may include an appropriate wired or wireless communications interface (i.e., network adaptor) to facilitate this communication. For example, a telephone (e.g., cellular) network or a wired local network (e.g., LAN, WAN, etc.), a short-range, wireless network (e.g., WiFi, Bluetooth, etc.) and the like may be used. It will be appreciated that these example network types are not intended to be limiting, and that the network 105 may be configured as any appropriate type of network. Additionally, in some embodiments, the network 105 may include multiple types of networks.

In some arrangements, the network interface described above may be used to establish connections with other computing devices by way of the network 105. The network interface may include program logic that facilitates connection of the devices of the system 100 to the network 105. In some arrangements, the network interface may include any combination of a wireless network transceiver (e.g., a cellular modem, a Bluetooth transceiver, a Wi-Fi transceiver) and/or a wired network transceiver (e.g., an Ethernet transceiver). For example, the network interface may include an Ethernet device such as an Ethernet card and machine-readable media such as an Ethernet driver configured to facilitate connections with the network 105. In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted.

The server 110 may be a computing system for a particular company (e.g., a financial institution). In other words, the server 110 may be configured to receive, process, and/or transmit data from/to a variety of systems, subsystems, or devices, and accordingly may be able to perform a variety of calculations, processes, estimations, etc., using this data. As described in greater detail below with respect to FIG. 2, the server 110 may include a variety of components for executing instructions (e.g., via computer code) to perform these various actions. In some arrangements, the server 110 is hosted or maintained by the same company that hosts/maintains the other components of the system 100, described in detail below. In some arrangements, the server 110 may be a remote computing system, such as a cloud computing system. In some arrangements, the server 110 a component of a cloud system. In some arrangements, the server 110 may be hosted or implemented by a third party (e.g., other than the company that monitors/operates the various other components of the system 100).

The system 100 also includes devices for facilitating transactions shown as host devices 300. The host devices 300 may include teller stations (i.e., teller systems), ATMs, POS devices, and the like.

Teller stations may include a variety of components utilized by a teller (i.e., a bank employee) to conduct transactions with or for a customer. For example, a teller station can include one or more cash drawers or cassettes, a cash recycler, receipt validators/printers, a user interface, etc., that enable the teller to conduct transactions such as check cashing, deposits (e.g., of checks or bills), transfers, etc. In some arrangements, teller stations include at least a user interface and a cash recycler configured to receive, store, and/or dispense bills (e.g., currency). For example, a teller may deposit a plurality of bills into a teller station, and teller station may analyze (e.g., for quality/authenticity), count, sanitize, and/or store the bills in a plurality of cassettes. Likewise, teller stations may retrieve stored bills in response to a customer requesting funds (e.g., from the teller) by routing the bills from a cassette and through a bill path, to a bill input/output (I/O) slot.

ATMs may be specialized devices that allow a user (e.g., a customer) to access an account held at a financial institution, such as to deposit, withdraw, or transfer funds, among other functions. Like the teller stations, ATMs may include a user interface and a housing having deposited therein at least one cassette for storing bills; however, in some cases, the housing of an ATM may include multiple cassettes (e.g., for storing separate denominations of bills). When interacting with an ATM, a user may provide account information by inserting or contactlessly providing a bank card and/or may input (e.g., via the user interface) various account details (e.g., username, account number, password, PIN, a biometric identifier, etc.) to access the user's account. If the user wishes to withdraw funds, the user may identify an account to withdraw the funds from and may input a desired withdrawal amount. Upon confirmation/authentication of the user and/or the transaction, ATM may retrieve appropriate bills from the one or more cassettes and may dispense the bills via an I/O slot.

As described herein, both teller stations and ATMs are examples of the host devices 300. In general, the host devices 300 are configured to house and/or utilize one or more universal cassettes 200. Accordingly, it will be appreciated that the host devices 300 described below a can include teller station and ATM, but are not limited to only these devices. Other host devices 300 that utilize universal cassettes 200 are also contemplated by the present disclosure. For example, host devices 300 may also include point-of-sale (POS) systems, cash recyclers (e.g., other than in a teller station), vending machines, or any other device that operates by receiving, storing, and/or dispensing bills. Examples of host devices 300, including teller station(s) and ATM(s), are described in greater detail below with respect to FIG. 3.

In some arrangements, the host devices 300 are structured to receive and store bills in one or more cassettes such as the universal cassettes 200. In some arrangements, the host device(s) 300 include a universal cassette housing 400 therein. For example, the host device(s) may include a built-in universal cassette housing 500 provided therein. The host devices 300 may be communicatively coupled to the universal cassettes 200, and/or the universal cassette housing 400 either directly (e.g., by a wired or wireless connection) or indirectly via the network 105.

As mentioned briefly above, the universal cassettes 200 are devices structured for installation or implementation in the host devices 300 and/or the universal cassette housing 400, and are configured to receive, store, and/or dispense bills. Accordingly, each of the universal cassettes 200 may include a storage area for holding any number of bills. In some embodiments, each of the universal cassettes 200 may be configured to store a particular denomination of bill (e.g., only $20 bills). For example, the universal cassettes 200 may be preconfigured (e.g., preprogrammed) to be associated with a particular denomination, or may determine an associated denomination of bill during a filling operation, a service operation, or a rebalancing operation. For example, the universal cassettes 200 may detect, via one or more sensors, a denomination of a first bill and may record this denomination. In some embodiments, the particular denomination stored by each of the universal cassettes 200 may be determined by a position (e.g., defined by a physical partition such as a wall or barrier or a logical partition within a memory of the respective host device 300 or universal cassette housing 500) within a host device 300 and/or a universal cassette housing 400. For example, a universal cassette 200 may be docked in a position associated with a particular denomination within the host device 300 or universal cassette housing 400. In some embodiments, the universal cassettes 200 may be configured to accept multiple denominations.

The universal cassettes 200 may advantageously be designed to work with a variety of different host devices 300 and/or universal cassette housings 400, therefore solving the technical problem of cross-device interoperability. In other words, the universal cassettes 200 may be structured for installation in various types, styles, or models of host devices 300 including host devices 300 that have a built-in universal cassette housing 500 provided therein and/or installation in a removable universal cassette housing 700. For example, the universal cassettes 200 may be adapted to be docked in both teller stations and ATMs, and may be swapped between the two types of devices. Additionally, universal cassettes 200 may include a control circuit to perform a variety of functions not typically handled by a cassette (e.g., for an ATM or cash recycler). For example, universal cassettes 200 may be configured to detect a denomination, quality, and/or authenticity of stored bills, and may also track the number (i.e., amount) or fill level of stored bills. In this manner, it can be determined whether universal cassettes 200 are full, nearly-full, empty, or nearly-empty, and one or more automated actions can be initiated. Additional features and components of universal cassettes 200 are described in greater detail with respect to U.S. patent application Ser. No. 17/205,587, incorporated herein by reference in its entirety.

In some arrangements, universal cassettes 200 may be considered "full" if a fill level of the cassette exceeds a first threshold (e.g., a maximum threshold). Likewise, in some embodiments, the universal cassettes 200 may be considered "empty" if a fill level of the cassette exceeds a second threshold (e.g., a minimum threshold). According to various embodiments, the fill level may be a quantity (e.g., a number of bills), a percentage (e.g., a number of bills relative to total capacity), and/or a height of a stack of bills. In some arrangements, both a maximum and minimum threshold may be established for a particular cassette. For example, the "full" threshold for a first universal cassette may be 90% capacity, such that the universal cassette is considered full and in need of replacement or emptying (i.e., rebalancing) once the fill level of the cassette reaches or exceeds 90%. The "empty" threshold for the first universal cassette may be 10% capacity, such that the universal cassette is considered empty and in need of replacement or refilling (i.e., rebalancing) once the fill level of the cassette reaches or falls below 10%. In some embodiments, additional thresholds may also be set, such as a third threshold representing "nearly-full" (e.g., >80%) and/or a fourth threshold representing "nearly-empty" (e.g., <20%). Thus, it will be appreciated that full, nearly-full, empty, or nearly-empty may represent any suitable fill level or threshold, and that multiple thresholds may be established for a particular cassette.

The universal cassette housing 400 is a housing that is structured to receive one or more universal cassettes 200. The universal cassette housing 400 is structured to facilitate rebalancing operations between two or more cassettes that are docked with the universal cassette housing 400.

As briefly described above, in some arrangements, the universal cassette housing 400 may be a built-in universal cassette housing 500 that is permanently fixed to or integrated with the host device(s) 300. For example, one or more of the host device(s) 300 may have a built-in universal cassette housing 500 fixed thereto or integrated therewith. The built-in universal cassette housing 500 may be structured to perform a rebalancing operation between universal cassettes 200 that are docked with the host device 300 and/or with the built-in universal cassette housing 500. In some arrangements, the built-in universal cassette housing 500 may include or be a part of a transport apparatus that is operable to couple to the docked universal cassettes 200 and facilitate transferring bills among the docked universal cassettes 200.

As briefly described above, in some arrangements, the universal cassette housing 400 may be a removable universal cassette housing 700 that is a stand-alone unit (e.g., separate from a host device 300) and/or may be removably coupled to a host device 300. For example, the removable universal cassette housing 700 may be structured to perform a rebalancing operation on universal cassettes 200 docked with the removable universal cassette housing 700. In some arrangements, the removable universal cassette housing 700 includes a transport apparatus that is operable to facilitate transferring bills among the docked universal cassettes 200. In some arrangements, the removable universal cassette housing 700 is removably coupled to a host device 300 such that the removable universal cassette housing 700 is operable to facilitate a rebalancing operation on universal cassettes 200 docked with the host device 300.

Figure 2:
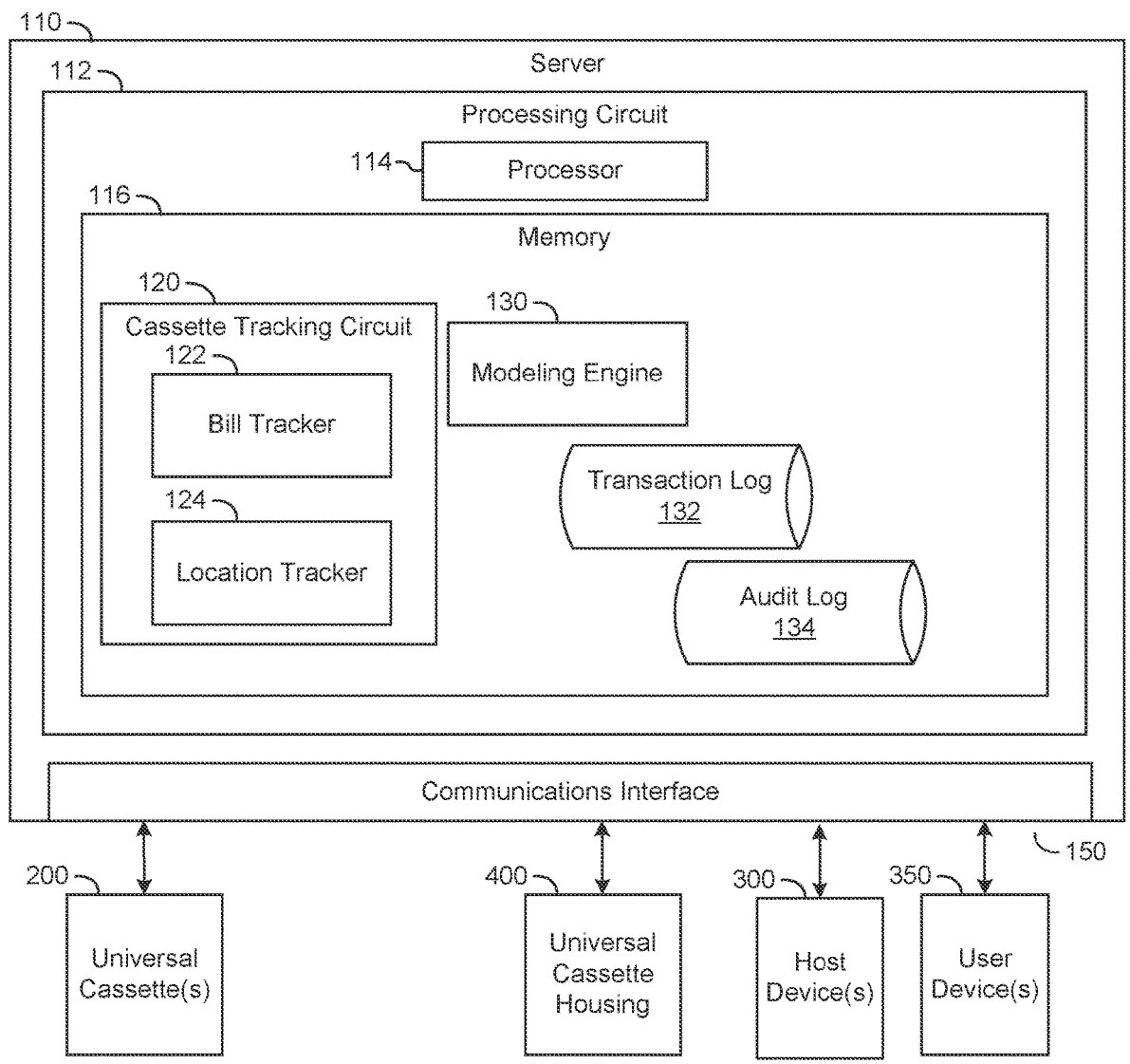
FIG. 2 is a block diagram of a server of the cassette management system of FIG. 1, according to an example arrangement.

FIG. 2 is a block diagram of a server 110 of the cassette management system 100 of FIG. 1, according to an example arrangement. As described briefly above, the server 110 may be a central computing system for a company or institution. In some arrangements, the server 110 is a remote computing system, not physically co-located with the other components of system 100. For example, the server 110 may be a cloud server or other computing device operated (e.g., hosted and/or maintained) by a third party. In some arrangements, the server 110 may be physically located at a central branch of a financial institution (e.g., at a headquarters building, in a data center, etc.) rather than at an individual branch. In some embodiments, however, the server 110 is a central computing device for a single branch or a group of branches of a company or institution. For example, the server 110 may be located at a single branch of a financial institution, and may communicate with equipment local to that branch, and/or at multiple other branches.

The server 110 is shown to include a processing circuit 112 that includes a processor 114 and memory 116. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicatively coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the server 110 is configured to run a variety of application programs and store associated data in a database of the memory 116. In various embodiments, the processor 114 is implemented as a general-purpose processor, an application specific integrated circuit (ASIC), one or more field programmable gate arrays (FPGAs), a digital signal processor (DSP), a group of processing components, or other suitable electronic processing components structured to control the operation of server 110. Memory 116 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application.

The memory 116 is shown to include a cassette tracking circuit 120. The cassette tracking circuit 120 includes a bill tracker 122 and a location tracker 124. Together, the components of cassette tracking circuit 120 are configured to track (i.e., monitor) the fill levels, locations, denominations, and any other suitable parameters of a plurality of universal cassettes (e.g., universal cassettes 200). In particular, bill tracker 122 may be configured to track at least a fill level and a denomination associated with each of a plurality of universal cassettes 200. In some embodiments, bill tracker 122 receives data indicating a fill level and/or a denomination from a universal cassette 200 via a communications interface 150, described in detail below. Specifically, bill tracker 122 may receive fill level and denomination data from universal cassettes 200 at one or more time intervals (e.g., every millisecond, ever second, ever minute, and so on). For example, bill tracker 122 may receive data in response to a query or request for the data (e.g., bill tracker 122 may transmit a prompt to one or more of the universal cassettes 200), at a regularly scheduled time or interval (e.g., ever minute, ever hour, every day, and so on), or continuously (e.g., in real-time, after each transaction, every second, and so on).

Location tracker 124 may be configured to track a location of each of the plurality of universal cassettes 200, by receiving location data from the universal cassettes 200, from a host device 300 associated with a universal cassette 200, and/or a universal cassette housing 400 associated with a universal cassette 200. Location data may include, for example, a street address, latitude and longitude, information provided by a global positioning system (GPS) transceiver associated with a universal cassette 200, a host device 300 and/or a universal cassette housing 400, or other data that allows server 110 to determine a location of a cassette. In some cases, location data may include identifying information for a host device 300 currently utilizing a universal cassette 200, such as a location, identification number, model number, etc., of the host device 300. The location tracker 124 may receive location data once, or at regular time intervals. For example, the locations of the universal cassettes 200 may be transmitted or requested when a universal cassette 200 is docked or undocked, every 30 seconds, every hour, one per day or week, when a cassette power source (e.g., battery) reaches a predetermined depletion threshold (e.g., 5%, 10%), etc.

In addition to fill levels, denominations, and locations of the universal cassettes 200, the cassette tracking circuit 120 may track (i.e., monitor) various other parameters associated with universal cassettes 200. For example, the cassette tracking circuit 120 may receive/retrieve a battery level, maintenance/repair details, transaction details, bill quality information, user access information, and any other parameters that may be provided by a universal cassette 200. In some embodiments, transaction details from the host devices 300, the universal cassettes 200, and/or a universal cassette housing 400 may be used to generate transaction logs 132, stored in a database of memory 116. The transaction logs 132 may include information for each transaction processed by the host device 300, the universal cassettes 200, and/or the universal cassette housing 500, such as a type of transaction, user identifying information, account identifying information, a number of bills withdrawn/deposited, a time and location of the transaction, bill serial number(s) determined via optical character recognition (OCR), check serial number(s) determined via OCR or magnetic ink character recognition (MICR) for cassettes configured to store checks, and the like.

Similarly, various other parameters/data may be used to generate audit logs 134. The audit logs 134 may include a variety of information that is required for an audit (e.g., of a financial institution) and/or that may aid in the tracking and security of the universal cassettes 200. For example, location data (e.g., including indications of when a universal cassettes 200 is moved), user access data, fill levels, fill/refill times, maintenance/repairs, utility operations, and other information may be recorded via audit logs 134, such that a user (e.g., an auditor, a branch manager, etc.) can access the audit logs 134 at any time to review said information for each of the universal cassettes 200.

Memory 310 is also shown to include a modeling engine 130, configured to execute predictive models for simulating operations of system 100. Predictive models are generally mathematical representations of various operations of system 100 that, when executed by server 110 using a set of input values, can predict or estimate an output (e.g., a result). For example, a predictive model may be executed to estimate how quickly a universal cassette 200 is filled based on historical transaction or fill level data, a location of the universal cassette 200, etc. Modeling engine 130 may generate and/or execute any type of predictive model, such as neural networks, random forests, decision trees, least squares, etc. Over time, modeling engine 130 may also improve or dynamically update these predictive models as additional data is collected (e.g., by cassette tracking circuit 120).

In some embodiments, modeling engine 130 is configured to predict usage for one or more of universal cassettes 200. For example, based upon a host device 300 that a universal cassette 200 is docked to and/or a location of the universal cassette 200, the modeling engine 130 may be configured to predict how quickly the universal cassette 200 will fill or empty. In this manner, modeling engine 130 may be able to predict and/or generate a projection (schedule) for replacing the universal cassette 200 preemptively (e.g., before it is full or empty).

The modeling engine 130 may also be structured to predict when the universal cassettes 200 of the system 100 will reach a fill level that warrants a rebalancing operation. In some arrangements, the universal cassettes 200 are associated with a host device 300. In some arrangements, the universal cassettes 200 are not associated with a host device 300.

In some embodiments, the modeling engine 130 is structured to predict when a host device 300 requires a rebalancing operation. For example, the modeling engine 130 may be structured to predict that a host device 300 needs a rebalancing operation based on usage of the universal cassettes 200. In this manner, modeling engine 130 may be able to predict and/or generate a projection (schedule) for executing rebalancing operations preemptively. For example, a host device 300 may have a quantity of bills designated as "working cash" for withdrawal transactions. Bills that are a part of a rebalancing operation are excluded from the "working cash" during the rebalancing operation. Accordingly, the modeling engine 130 may determine a quantity of bills to include in the rebalancing operation and/or when to perform the rebalancing operation such that the host devices 300 have enough "working cash" to continue to perform withdrawal transactions.

In some arrangements, a host device 300 may have a quantity of universal cassettes 200 that receive/dispense bills. Bills received from a user (e.g., customer) during a deposit transaction and/or bills dispensed to a user during a withdrawal transaction may be removed from or stored in the universal cassettes 200, respectively. The bills may be sorted into a particular universal cassette 200 when deposited and/or dispensed from a particular universal cassette 200 when withdrawn. One or more of the universal cassettes 200 may receive enough bills to become full or nearly full and/or dispense enough bills to become empty or nearly empty. In some arrangements, the server 110 may receive (e.g., from the universal cassettes 200, the host device 300, the universal cassette housing 500) data about the amount of bills deposited and withdrawn from each universal cassette (i.e., the fill level of each universal cassette 200). Accordingly, the modeling engine 130 may determine when to execute a rebalancing operation such that the universal cassettes 200 do not exceed maximum or minimum thresholds for bill storage (i.e., a maximum "full" threshold or a minimum "empty" threshold).

Likewise, in some arrangements, the modeling engine 130 may predict bill requirements based on the location of a host device 300 or a universal cassette 200. For example, modeling engine 130 may analyze historical data to determine that particular location dispenses a particularly high number of $20 bills each day, such that it may be beneficial to increase the frequency with which the universal cassettes 200 at that location are replaced and/or rebalanced. As another example, historical data may indicate that an ATM at a specific location experiences in influx in transactions on a certain day or weekend (e.g., corresponding to a particular event, such as a fair, a Friday night in a busy area, etc.). Modeling engine 130 may identify these trends and adjust a schedule or frequency with which universal cassettes 200 are replaced and/or rebalanced. Accordingly, the modeling engine 130 may generate a prediction and provide instructions for determining a rebalancing operation based on historical data.

In some arrangements, when the system 100 includes more than one universal cassette housing 400, server 110 may be structured to determine (e.g., by the processing circuit 112 and/or the modeling engine 130) at which of the universal cassette housing(s) 400 to perform a rebalancing operation. For example, the server 110 may determine that a rebalancing operation should be performed at a stand-alone removable universal cassette housing 700 (e.g., based on location data, fill level, and/or other parameters associated with the universal cassettes 200). Similarly the sever 110 may determine that a rebalancing operation should be performed at a built-in universal cassette housing 500 (e.g., based on the same or other parameters).

Still referring to FIG. 2, communications interface 150 may be configured for transmitting and receiving various data and signals with other components of system 100. As shown, for example, server 110 can communicate with universal cassettes 200, host devices 300, user devices 350, and/or the universal cassette housing 400 via communications interface 150. Accordingly, communications interface 150 can include a wireless network interface (e.g., 802.11X, ZigBee, Bluetooth, Internet, etc.), a wired network interface (e.g., Ethernet, USB, Thunderbolt, etc.), or any combination thereof.

The user devices 350 can include, but are not limited to, mobile phones, electronic tablets, laptops, desktop computers, workstations, and other types of electronic devices. More generally, the user devices 350 may include any electronic device that allows a user to interact with the server 110 (e.g., through a user interface). Accordingly, each of the user devices 350 can include an input device (e.g., a keyboard) and an output device (e.g., a screen). In one example, the user device 350 is a computer that provides user access to the operations of the server 110 to allow the user to view operating, transaction, or audit data (e.g., locations and fill levels, predicted future bill requirements, audit logs 134 associated with the universal cassettes 200 and/or utility devices etc.), change various settings or parameters of server 110, and/or provide user-defined control inputs to control operations of the server 110.

Figure 3:
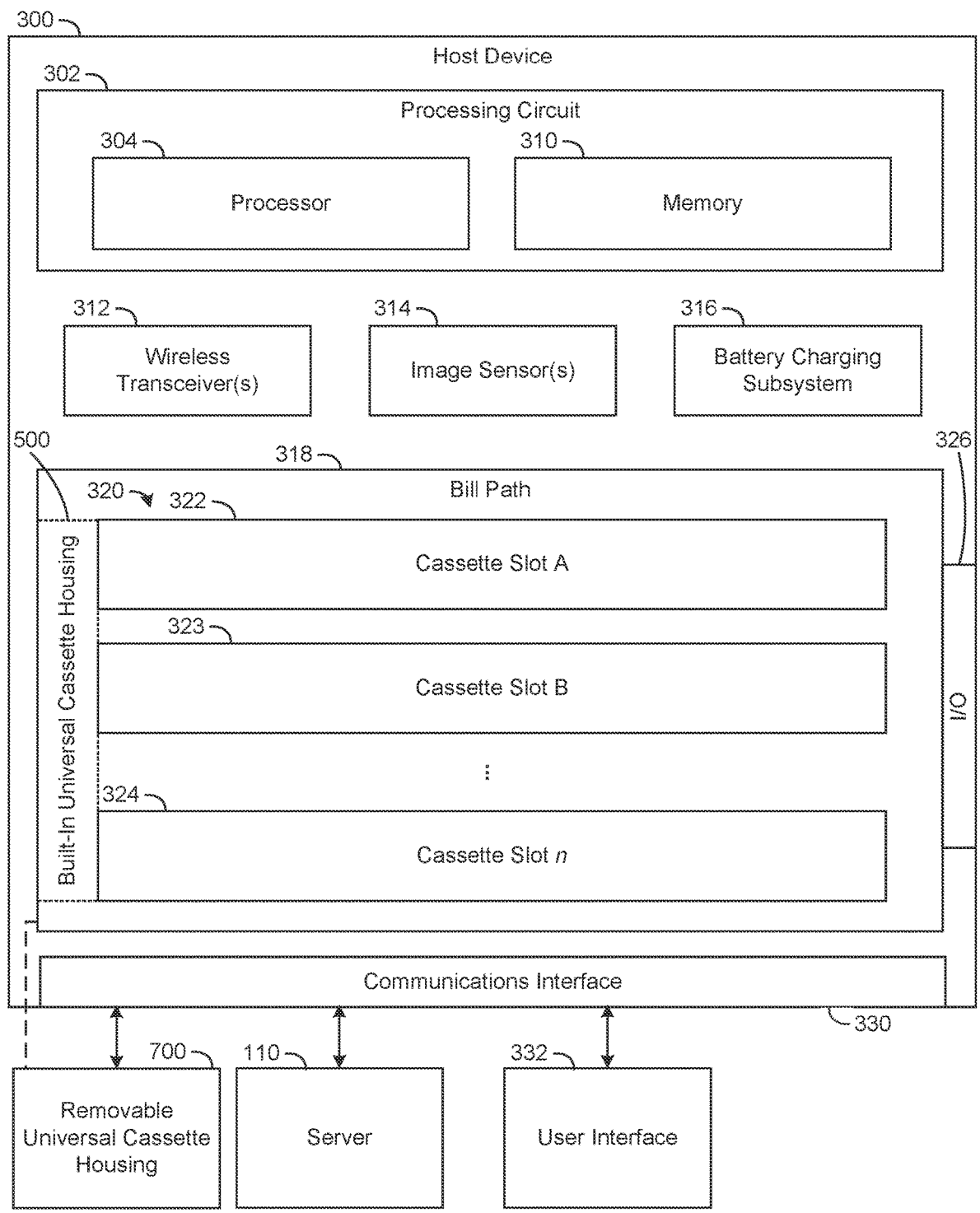
FIG. 3 is a block diagram of a host device of the cassette management system of FIG. 1, according to an example arrangement.

FIG. 3 is a block diagram of a host device 300 of the cassette management system 100 of FIG. 1, according to an example arrangement. As described above, a host device 300 may be any device configured to house and/or utilize universal cassettes 200. For example, the host device 300 may represent an ATM, a teller station, a cash recycler, a POS system, a vending machine, or any other device that contains one or more cassettes (e.g., universal cassettes 200) for receiving or dispensing bills. In some arrangements, and as briefly described above, the host device 300 may include a built-in universal cassette housing 500 that is integrated with the host device 300. In some arrangements, and as briefly described above, the host device 300 may be operably coupled to a removable universal cassette housing 700 (as shown by the dashed line in FIG. 3).

The host device 300 includes a processing circuit 302. The host device 300 also includes one or more devices shown as wireless transceiver(s) 312, image sensor(s) 314, and a battery charging subsystem 316. The host device 300 also includes a bill path 318 structured to interface with one or more cassette slots 320. For example, the host device 300 may include a first cassette slot shown as "Cassette Slot A" 322, a second cassette slot shown as "Cassette Slot B" 323, and an nth cassette slot shown as "Cassette Slot n" 324. In some arrangements, the host device 300 includes more or fewer of the cassette slots 320 than as shown in FIG. 3. In some arrangements, the bill path 318 is coupled to an input/output device shown as I/O 326. In some arrangements, the host device 300 is operatively coupled to a universal cassette housing 500. The host device 300 may also include a communication interface 330 that is configured for transmitting and receiving various data and signals with other components of system 100. As shown, for example, host device 300 can communicate with at least the server 110 and a user interface 332 via the communications interface 330. Accordingly, communications interface 330 can include a wireless network interface (e.g., 802.11X, ZigBee, Bluetooth, Internet, etc.), a wired network interface (e.g., Ethernet, USB, Thunderbolt, etc.), or any combination thereof.

The processing circuit 302 includes a processor 304 and a memory 310. The memory 310 may be one or more devices (e.g., RAM, ROM, Flash memory, hard disk storage) for storing data and/or computer code for completing and/or facilitating the various processes described herein. The memory 310 may be or include non-transient volatile memory, non-volatile memory, and non-transitory computer storage media. The memory 310 may include database components, object code components, script components, or any other type of information structure for supporting the various activities and information structures described herein. The memory 310 may be communicatively coupled to the processor 304 and include computer code or instructions for executing one or more processes described herein. The processor 304 may be implemented as one or more application specific integrated circuits (ASICs), field programmable gate arrays (FPGAs), a group of processing components, or other suitable electronic processing components. As such, the host device 300 is configured to run a variety of application programs and store associated data in a database of the memory 310.

Host device 300 is also shown to include one or more wireless transceivers 312. Wireless transceivers 312 may include any device configured to transmit and receive wireless data or signals. For example, wireless transceivers 312 may include one or more components for communicating via VHF or UHF radio waves. In some embodiments, wireless transceivers 312 include at least a long-range and a short-range style transceiver, although in other embodiments, wireless transceivers 4312 include either a long or short-range transceiver. In some embodiments, wireless transceivers 312 include at least one of a WiFi, Bluetooth®, or radio-frequency identification (RFID) transceiver. It will be appreciated, however, that wireless transceivers 312 are not limited to just these examples of wireless transceiver devices/technologies, and that any type of wireless transceiver may be included in host device 300. In some embodiments, wireless transceivers 312 may also be coupled to, or a portion of, communications interface 330. For example, the wireless transceivers 312 may be utilized to communicate with other components of system 100 via communications interface 330.

Host device 300 is also shown to include image sensors 314 configured to capture image data. More specifically, image sensors 314 may be configured to read QR codes, barcodes, or other similar identification tags, such as to identify a universal cassette 200, a utility cassette docked into host device 300 or a utility module coupled to an exterior of the host device 300. Accordingly, image sensors 314 may include a light source, one or more lenses, and sensors for receiving optical pulses or other image data.

However, image sensors 314 may also include any other components sufficient to read said identification tags. In one example, image sensors 314 include at least a QR code scanner and/or a barcode reader for scanning and interpreting QR codes or barcodes attached to an outer housing/shell of a universal cassette 200.

By scanning said identification tags, host device 300 may determine that a universal cassette 200 is docked (e.g., within the host device 300 and/or within the built-in universal cassette housing 500) and may also determine additional information regarding the universal cassette 200. For example, host device 300 may determine an identification code for a universal cassette 200, and may transmit the code or send a request to server 110. Server 110 may respond by sending data such as a name or identifier for the universal cassette 200, parameters associated with the universal cassette 200 (e.g., denomination, maximum allowable fill level, minimum allowable fill level, etc.), and any other information related to the identified universal cassette 200. In some embodiments, the information is determined at least in part based on the location of the universal cassette 200, host device 300 and/or universal cassette housing 500.

In some embodiments, the server 110 may update a database (e.g., transaction logs 132 and/or audit logs 134) once a notification and/or identification code for a universal cassette 200 is received, in order to track the universal cassette 200. In some embodiments, to maintain a closed cash cycle within a branch, the server 110 may maintain a database of universal cassette 200 cross-referenced to particular allowable locations (e.g., host device identifiers, geographical area, and the like). The host device 300 may be structured to transmit this information, when a particular universal cassette 200 is docked (e.g., to the host device 300 and/or to a universal cassette housing 500 associated with the host device 300), to the server 110, and the server 110 may, based on cross-referencing this information to the database, generate an electronic message to the host device 300 to accept or reject a particular universal cassette 200.

Host device 300 is also shown to include a battery charging subsystem 316. Battery charging subsystem 316 may include one or more components configured to charge a battery of a docked universal cassette 200. In particular, battery charging subsystem 316 may include an interface or electrical connector for electrically coupling a battery of a universal cassette 200 to battery charging subsystem 316, and may also include a circuit for monitoring and controlling the charging of the universal cassette 200. For example, battery charging subsystem 316 may include a battery management system (BMS) for monitoring charge levels of each of one or more universal cassettes 200 docked with the host device 300, and for controlling the charging of the one or more universal cassette 200 (e.g., by limiting charge speed and power). It will be appreciated that battery charging subsystem 316 may be an optional component of host device 300 not included in systems where universal cassette 200 do not include internal batteries.

As shown, the host device 300 includes a bill path 318. The bill path 318 includes a series of suitable components, such as gears, rollers, belts, motors, tracks, etc., for transporting bills between components of host device 300. Specifically, bills may be transported from/to I/O port 326 to one of a series of cassettes docked into a plurality of cassette slots 320. In some embodiments, the bill path 318 may include at least one sensor structured to detect any of the bill count, denomination, quantity, serial number, etc.

As shown, host device 300 may include any number of cassette slots 320, configured to receive a universal cassette (e.g., one of universal cassettes 200). In other words, a cassette slot may be a "dock" for a universal cassette 200, and may include a series of connections for electronically or communicatively coupling the universal cassette 200 to the host device 300. As an example, a universal cassette 200 may be removably docked into a first cassette slot 322, thereby allowing bills to be stored in the docked cassette. In some embodiments, each of cassette slots 320 are associated with a different denomination or type of bill. For example, the first cassette slot 322 may be associated with $10 bills; therefore, a universal cassette docked into the first cassette slot 322 may be configured to store $10 bills either before or during installation.

The I/O port 326 is structured to facilitate transferring bills stored by the host device 300 (e.g., in one or more universal cassettes 200) and an exterior of the host device 300. For example, during a transaction, a user (e.g., a bank customer, a teller, etc.) may insert or withdraw bills from an I/O port 326. I/O port 326 may be a unidirectional or bidirectional port or slot, configured to receive and/or dispense bills. Bills being deposited, for example, may be received via I/O port 326 and may travel along a bill path 318.

In some arrangements and as briefly described above, the host device 300 is operatively coupled to the built-in universal cassette housing 500. In some arrangements, the built-in universal cassette housing 500 is integrated with the host device 300 (e.g., within a vault of the host device 300). In some arrangements, the built-in universal cassette housing 500 is coupled to an external surface of the host device 300. In some arrangements, the universal cassette housing 500 is removably coupled to the host device 300. In some arrangements, when the universal cassette housing 500 is removed from the host device 300, the host device 300 may be structured to continue performing transactions and/or operations that do not include the universal cassette housing 500. That is, the universal cassette housing 500 is permanently fixed to the host device 300. In some arrangements, the universal cassette housing 500 is structured to receive one or more universal cassettes 200.

In some arrangements, the built-in universal cassette housing 500 is structured to interface with the bill path 318 and/or the cassette slots 320. For example, in some arrangements, the bill path 318 may be operatively coupled to the built-in universal cassette housing 500. In some arrangements, the built-in universal cassette housing 500 may include a transport apparatus (shown, for example, as transport apparatus 518 in FIG. 5). The transport apparatus 518 may be a separate from the bill path 318 or the bill path 318 may at least partially form the transport apparatus 518. In some arrangements, the bill path 318 entirely forms the transport apparatus 518 such that the bill path 318 and the transport apparatus 518 are the same. In some arrangements, the transport apparatus 518 is structured to facilitate the transfer of bills among the universal cassettes 200 and/or transferring bills between the universal cassettes 200 and the host device 300 (e.g., via the bill path 318 when the transport apparatus 518 and the bill path 318 are at least partially separate, or directly when the bill path 318 and the transport apparatus 518 are the same). In some arrangements, the built-in universal cassette housing 500 includes one or more docking apparatuses (shown as docking apparatuses 520 in FIG. 5). In some arrangements, the one or more docking apparatuses 520 of the universal cassette housing 500 is/are appended to and/or at least partially replace the cassette slots 320. In some arrangements, the cassette slots 320 are at least partially formed by the one or more docking apparatuses 520 of the built-in universal cassette housing 500. In some arrangements, the docking apparatuses 520 are is structured to facilitate removably docking universal cassettes 200 and transferring bills to/from the universal cassettes 200 via the bill path 318 and/or the transport apparatus 518.

In some arrangements, the transport apparatus 518 is operatively coupled to an escrow area (not shown). The escrow area may be part of the built-in universal cassette housing 500 and/or the host device 300. The escrow area may be structured to temporarily store bills during a rebalancing operation. For example, the rebalancing operation may include a first set of bills being transferred from a first universal cassette to a second universal cassette and a second set of bills being transferred from the second universal cassette to the first universal cassette. The escrow area may be structured to temporarily store one or more of the first set of bills and the second set of bills during the rebalancing operation.

In some arrangements and as briefly described above, the host device 300 may be operatively coupled to the removable universal cassette housing 700 such that the removable universal cassette housing 700 may perform a rebalancing operation with the universal cassettes 200 docked with the removable universal cassette housing 700 and/or the host device 300. In some arrangements, the removable universal cassette housing 700 is coupled to an external surface of the host device 300. In some arrangements, the removable universal cassette housing 700 is removably coupled to the host device 300 (e.g., removably coupled to a vault of the host device 300). In some arrangements, when the removable universal cassette housing 700 is removed from the host device 300, the host device 300 may be structured to continue performing transactions and/or operations that do not include the removable universal cassette housing 700. In some arrangements, the removable universal cassette housing 700 is structured to perform rebalancing operations separate from the host device 300. In some arrangements, the removable universal cassette housing 700 is structured to receive one or more universal cassettes 200.

In some arrangements, the removable universal cassette housing 700 is structured to interface with the bill path 318. For example, in some arrangements, the bill path 318 may be operatively coupled to the removable universal cassette housing 700. In some arrangements, the removable universal cassette housing 700 may include a transport apparatus (shown, for example, as transport apparatus 718 in FIG. 8). The transport apparatus 718 is separate from the bill path 318. In some arrangements, the bill path 318 is structured to operably couple to the transport apparatus 718. In some arrangements, the transport apparatus 718 is structured to facilitate the transfer of bills among the universal cassettes 200 and/or transferring bills between the universal cassettes 200 and the host device 300 (e.g., via the bill path 318). In some arrangements, the removable universal cassette housing 700 includes one or more docking apparatuses (shown as docking apparatuses 720 in FIG. 8). In some arrangements, the one or more docking apparatuses 720 of the removable universal cassette housing 700 is/are appended to the cassette slots 320 when the removable universal cassette housing 700 is coupled to the host device 300. In some arrangements, the docking apparatuses 720 are is structured to facilitate removably docking universal cassettes 200 and transferring bills to/from the universal cassettes 200 via the bill path 318 and/or the transport apparatus 718.

The communications interface 330 may be configured for transmitting and receiving various data and signals with other components of system 100. As shown, for example, host device 300 can communicate with the server 110 and/or a user interface 332 via communications interface 150. In some arrangements, the communications interface 330 is also structured to communicate with the docked universal cassettes 200 and/or a built-in universal cassette housing 500 that is associated with the host device 300. In some arrangements, the communications interface 330 is structured to communicate with a removable universal cassette housing 700 (e.g., when the removable universal cassette housing is coupled to the host device 300). Accordingly, communications interface 150 can include a wireless network interface (e.g., 802.11X, ZigBee, Bluetooth, Internet, etc.), a wired network interface (e.g., Ethernet, USB, Thunderbolt, etc.), or any combination thereof.

The user interface 332 can include an input device (e.g., a keyboard) and an output device (e.g., a screen) to allow a user to interact with host device 300. In some embodiments, user interface 332 may be part of a user device (e.g., user device 350 of FIG. 2), such as a mobile phone, electronic tablet, laptop, desktop computer, workstation, and other type of electronic device. In other embodiments, user interface 332 is a screen and input device of host device 300 itself. In an example where host device 300 is an ATM, user interface 332 may be a screen of the ATM, a number pad, and/or one or more additional keys for performing various functions, such as completing a transaction. In this example, a user (e.g., a customer) may use user interface 332 to input account information (e.g., a PIN) and transaction information (e.g., a type of transaction, an amount to deposit/withdraw, etc.), as well as to view information such as an account balance.

Figure 4:
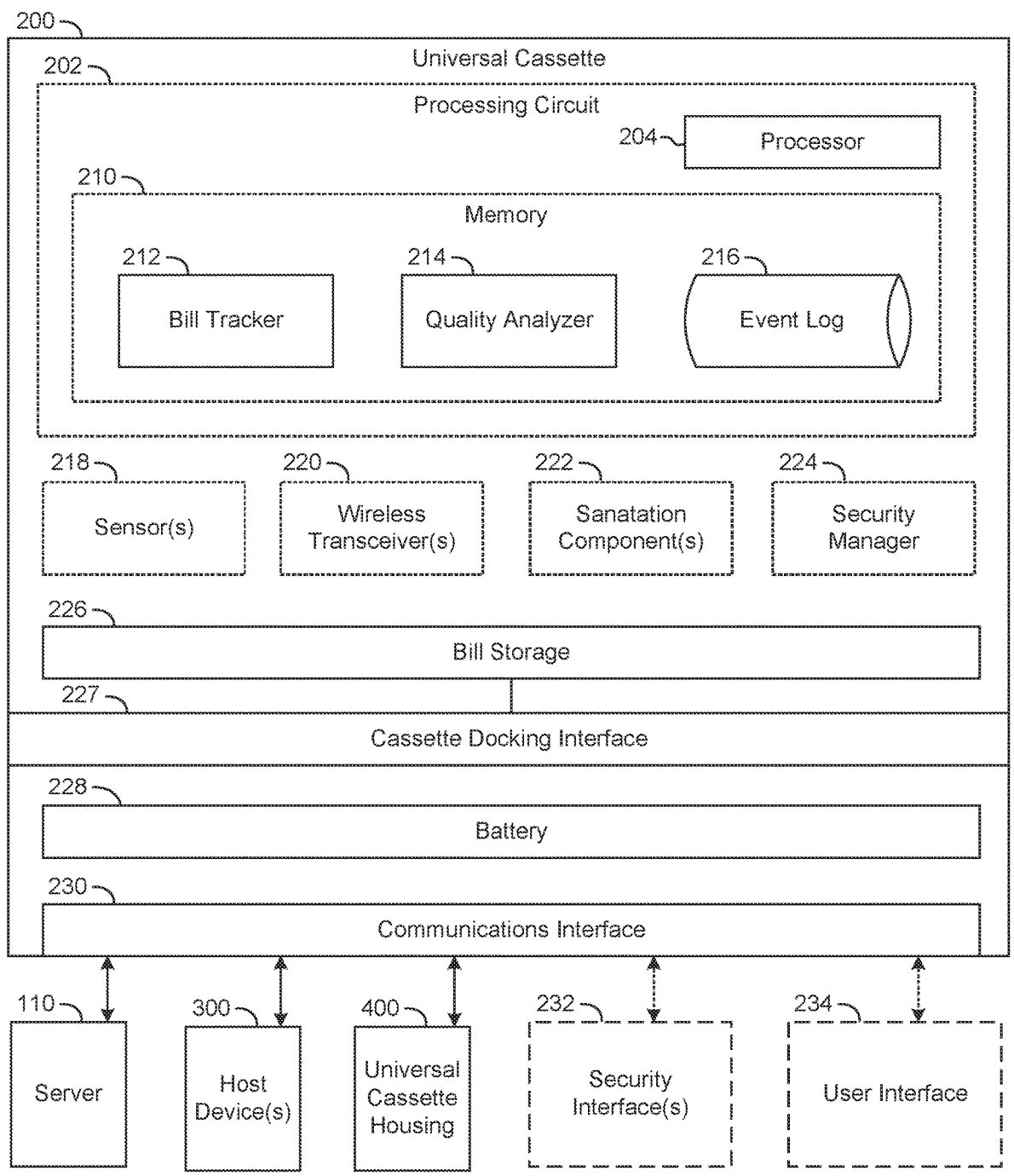
FIG. 4 is a block diagram of a universal cassette of the cassette management system of FIG. 1, according to an example arrangement.

FIG. 4 is a block diagram of a universal cassette 200 of the cassette management system 100 of FIG. 1, according to an example arrangement. As mentioned above, the universal cassette 200 may advantageously be utilized in multiple systems (e.g., ATMs, teller stations, POS systems, etc.) and may also include smart functionality not found in other types of cassettes. For example, the universal cassette 200 may be configured to track a number of stored bills and can determine its current location, which can be transmitted to the other components of system 100 for accurate cassette tracking. Additionally, the universal cassette 200 can alert the server 110 when a bill storage area is full, nearly full, nearly empty, or empty, allowing the server 110 to automatically identify a replacement universal cassette 200 and/or automatically cause a universal cassette housing 400 to perform a rebalancing operation.

The universal cassette 200 includes a communication interface 230 configured for transmitting and receiving various data and signals with other components of system 100. As shown, for example, the universal cassette 200 can communicate with at least the server 110, the host device 300, and the universal cassette housing 400 via communications interface 230. Accordingly, communications interface 230 can include a wireless network interface (e.g., 802.11X, ZigBee, Bluetooth, Internet, etc.), a wired network interface (e.g., Ethernet, USB, Thunderbolt, etc.), or any combination thereof.

In some embodiments, the universal cassette 200 may also communicate with additional components such as security interfaces 232 and/or a user interface 234. It will be appreciated, however, that the security interfaces 232 and/or the user interface 234 may be optional components depending on an embodiment of the universal cassette 200. The security interfaces 232 may include any of a number of components or devices for controlling access/entry to the universal cassette 200, and in particular to a bill storage area (e.g., a bill storage 226) of the universal cassette 200. In particular, the security interfaces 232 may include finger print scanners, a number pad, an electronic lock, an identification card reader, a biometrics scanner, or any other interfaces that allow a user to input security/access information. Security interfaces 232 may operate cooperatively with security manager 224, described in detail below, to restrict, track, and/or control access to the universal cassette 200.

The security manager 224 may analyze inputs to security interfaces 232 in order to identify users (e.g., attempting to access or manipulate the universal cassette 200) and authorize access. The security manager 224 may be configured to receive user identification data, such as a username, password, PIN, access card number, or other information entered via the security interfaces 232 and/or the user interface 234. As an example, a user may transmit a lock code electronically, via an e-lock on the user's mobile device, to the security interfaces 232. The security manager 224 may interpret the lock code and grant or deny access to the universal cassette 200. In some embodiments, security manager 224 may communicate (e.g., via communications interface 230) with the server 110 to access a central authentication or access system that maintains user records. For example, the security manager 224 may transmit identifying information for a user attempting to access the universal cassette 200 (e.g., an ID number, a name, etc.) to the server 110, and the server 110 may access an authentication system to verify the user's details. Assuming the user can be authenticated, the server 110 may transmit a notification back to the universal cassette 200, causing the universal cassette 200 to grant the user access.

In some embodiments, the security interfaces 232 described above include at least a manual or electronic lock configured to restrict access to the bill storage 226. In some such embodiments, the universal cassette 200 may remain locked when not docked to a host device to prevent unauthorized access. In some embodiments, the security manager 224 may be configured to track access to the universal cassette 200 and/or the bill storage 226, such as by determining and recording when a key, access code, etc., is inserted/entered to unlock the cassette. The security manager 224 may be configured update an event log 216 each time the universal cassette 200 is unlocked, in order to track any opening of the universal cassette 200 or access to the bill storage 226.

The user interface 234 can include an input device (e.g., a keyboard) and an output device (e.g., a screen) to allow a user to interact with the universal cassette 200. For example, the user interface 234 may include a screen and a number or keypad that allows a user to interact directly with the universal cassette 200. In some embodiments, one or more components of the user interface 234 may also be utilized as the security interface 232. For example, a user may interact with a number pad of the user interface 234 to enter a PIN or security access code.

Still referring to FIG. 4, the universal cassette 200 is shown to include a processing circuit 202 that includes a processor 204 and memory 210. Together with the other components of the universal cassette 200, described in detail below, the processing circuit 202, the processor 204, and the memory 210 form at least a portion of a control circuit for the universal cassette 200. In various embodiments, the processor 204 is implemented as a general-purpose processor, an application specific integrated circuit (ASIC), one or more field programmable gate arrays (FPGAs), a digital signal processor (DSP), a group of processing components, or other suitable electronic processing components structured to control the operations of the universal cassette 200.

The memory 210 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 210 may be or include volatile memory or non-volatile memory. The memory 210 may include database components, object code components, script components, or any other type of information structure for supporting the various activities and information structures described in the present application. According to an exemplary embodiment, the memory 210 is communicatively connected to the processor 204 via the processing circuit 202 and includes computer code for executing (e.g., by the processing circuit 202 and/or the processor 204) one or more processes described herein.

The memory 210 is shown to include a bill tracker 212, configured to track a number of bills stored in the bill storage 226 and/or to determine a fill level of the cassette (e.g., the fill level of the bill storage 226). In particular, the bill tracker 212 may receive data from one or more sensors 218 that indicates a fill level of the bill storage 226, and may track the fill level and/or the number of bills over time. The sensors 218 may include any of a plurality of sensors for measuring various parameters associated with the operations of the universal cassette 200 (e.g., fill level, denomination type, bill quality). In this case, the sensors 218 may include an optical sensor or other similar sensor that can count each bill as it is deposited into or retrieved from the bill storage 226. For example, as bills pass said sensor, the bill tracker 212 may add or subtract from a count of the total number of bills in the bill storage 226.

In some embodiments, the sensors 218 includes a fill sensor, configured to measure a height of a stack of bills in the bill storage 226, or to otherwise measure a fill level of the bill storage 226. In such embodiments, the fill sensor may include one or more switches, an optical sensor, or any other suitable sensor that can determine the fill level or dimensions of the stack of bills in the bill storage 226. The bill tracker 212 may determine a fill level of the bill storage 226 based on data from the sensors 218, and can track the fill level over time. In some embodiments, the sensors 218 can include multiple sensors for both counting a number of bills in the bill storage 226 and for determining the fill level of the bill storage 226.

In some cases, it may be advantageous to track both the bill count and fill level of the universal cassette 200, because bills often vary in dimensions between locations (e.g., regions, countries, states, climates, etc.), and based on age or quality. For example, well worn, old, or used bills may be significantly thicker than brand new bills, meaning that fewer bills can fit in the bill storage 226. Similarly, bills may be slightly thicker in areas with high humidity when compared to bills in areas of low humidity. Accordingly, a count of the bills as they enter/exit the universal cassette 200 and a fill level of the bill storage 226 can be used together to determine how many bills will fit in the bill storage 226 and/or to determine when the bill storage 226 is nearing full or empty.

In some embodiments, the bill tracker 212 may constantly or at least regularly adjust a threshold (i.e., limit) indicating that the bill storage 226 is full, nearly full, nearly empty, or empty, based on the sensor 218 data. For example, the bill tracker 212 may compare bill counts and fill levels at regular time intervals (e.g., every few minutes, once per day, etc.) to learn the quality and size of the bills in a current location. This knowledge of bill thickness, counts, fill levels, etc., can be used to adjust the threshold for the universal cassette 200 in real-time or near real time, making the universal cassette 200 much more flexible than other cassettes by more accurately tracking fill levels.

In some embodiments, the bill tracker 212 may operate cooperatively with a quality analyzer 214, which may also utilize data from the one or more sensors 218 to determine various bill quality parameters. In this case, the sensors 218 may include sensors that measure an age or condition of incoming bills, and may also include sensors that determine the authenticity of the bills. For example, optical sensors or other appropriate sensors can scan passing bills (e.g., entering the bill storage 226) to detect counterfeit bills and/or to detect non-recyclable bills (i.e., bills that are too old or worn for recirculation). The quality analyzer 214 may also determine, based on the sensor data, dimensions of the bills (e.g., thickness), which may be used to determine the number of bills that can be stored in the bill storage 226 before reaching the threshold.

In some embodiments, the quality analyzer 214 may detect non-recyclable (e.g., counterfeit, worn, etc.) bills, and may transmit an alert to the host device 300 and/or server 110. In such embodiments, the host device 300 may alter a transportation path of the non-recyclable bills, such as by routing the bills to a cassette specifically allocated for holding non-recyclable bills. In some embodiments, such as when counterfeit bills are detected, quality analyzer may alert server 110, which may cause server 110 to save transaction details for additional investigation.

In some embodiments, certain sensors 218 may be mounted on, or a part of, host device 300 rather than the universal cassette 200. In such embodiments, host device 332 and the universal cassette 200 may share sensor data, allowing the universal cassette 200 to utilize these external sensors to perform its various functions. It will also be appreciated that the sensors 218 may include any number of additional sensors not described herein. For example, the sensors 218 may also include sensors for detecting a battery level of the battery 228 and sensors for identifying bill denominations.

Still referring to FIG. 4, memory 210 is also shown to include (e.g., retrievably store) an event log 216 for recording transaction and event data. Specifically, the event log 216 may store transaction, bill count, fill level, and/or bill quality details, as well as storing records of a geographical location of the universal cassette 200, battery levels, maintenance events, etc. In other words, the event log 216 may act as an audit log for an individual cassette, tracking any and all event that occur before, during, and after installing the universal cassette 200 in a host device.

In some embodiments, the event log 216 may record a date, time, location, host device identification, and other suitable information each time the universal cassette 200 is docked into a host device, or each time the universal cassette 200 is moved. The event log 216 may also record a date, time, location, user ID, and other information each time the universal cassette 200 is accessed by a user, such as to empty or fill the bill storage 226, or to service the universal cassette 200. For example, a log may be created each time the universal cassette 200 is service, maintained, or calibrated, to ensure that the universal cassette 200 is operating correctly and accurately.

Still referring to FIG. 4, the universal cassette 200 is shown to include wireless transceivers 220. Like the wireless transceivers 312 of the host device 300, the wireless transceivers 220 may include any device configured to transmit and receive wireless data or signals. For example, the wireless transceivers 220 may include one or more components for communicating via VHF or UHF radio waves. In some embodiments, the wireless transceivers 220 include at least a long-range and a short-range style transceiver, although in other embodiments, the wireless transceivers 220 include either a long or short-range transceiver. In some embodiments, the wireless transceivers 220 include at least one of a WiFi, Bluetooth®, a cellular, or radio-frequency identification (RFID) transceiver. It will be appreciated, however, that the wireless transceivers 220 are not limited to just these examples of wireless transceiver devices/technologies, and that any type of wireless transceiver may be included in the universal cassette 200. In some embodiments, the wireless transceivers 220 may also be coupled to, or a portion of, the communications interface 230. For example, a WiFi transceiver may be utilized to communicate with other components of system 100 via the communications interface 230.

In some embodiments, the wireless transceivers 220 also include one or more devices or components for detecting a location of the universal cassette 200. In such embodiments, wireless transceivers 220 can include a GPS transceiver configured to detect a geographical location (e.g., latitude and longitude) of the universal cassette 200 in real or near-real time. In some embodiments, the wireless transceivers 220 include cellular transceivers for exchanging wireless data with one or more cellular towers. In such embodiments, a location of the universal cassette 200 may be determined based on a nearby tower or towers, such as by using triangulation based on the coordinates of one or more cellular towers. However, in other embodiments, a location of the universal cassette 200 is determined based on a connected host device. For example, the universal cassette 200 may lack components for determine its location, and may instead determine a location based on the connected host device.

In some embodiments, the universal cassette 200 includes sanitation components 222. Sanitation components may include one or more devices for sanitizing or otherwise cleaning incoming or stored bills. For example, the sanitation components 222 can include an ultra-violet (UV) light source, such as UV-C LEDs, that may irradiate bills before or during storage. The sanitation components 222 are generally configured to kill or deactivate harmful bacteria or viruses that may be present on the surface of bills. In some arrangements, the sanitation components 222 are further structured to perform a smoothing operation. Accordingly, the sanitation component 222 may include one or more bill smoothing components that are structured to perform the smoothing operations on incoming or stored bills. For example, sanitation components 222 can include rollers, presses, and the like to roll and/or press the bills to substantially remove wrinkles, creases, and/or folds from the bills. In some arrangements, the sanitation component 222 may include heating elements to heat the bills to remove wrinkles. For example, the heating elements may heat the presses and/or rollers to facilitate removing wrinkles. In some arrangements, the sanitation component 222 may include a steaming element to pass steam over and/or through the bills to facilitate removing wrinkles. In some arrangements, the smoothing components may be structured to apply a predetermined amount of heat, pressure, steam, or other smoothing element to the bills based on a predetermined smoothing parameter. The smoothing parameter may be determined based on a type of bill (e.g., denomination, currency type, bill material, an age of the bill, and/or other parameters associated with the bill) such that the bill is not damaged by the smoothing operations. In some arrangements, the smoothing parameters is configured such that the bills are substantially smoothed by the smoothing operation without significant risk to permanently damaging the bills (e.g., by damaging outer layers, embossments, raised inking, and/or other features of the bills).

In some arrangements, the universal cassette 200 may also include a cassette docking interface 227. The cassette docking interface 227 may be structured to facilitate communicatively coupling the universal cassette 200 to another device when the universal cassette 200 is docked with the device (e.g., the host device 300 and/or the housing 500). In some arrangements, the cassette docking interface 227 is structured to facilitate communicatively coupling the universal cassette 200 to other devices via the communications interface 230. For example, when a universal cassette 200 is docked with a built-in universal cassette housing 500 that is coupled to the host device 300, the cassette docking interface 227 is structured to facilitate communicatively coupling the universal cassette 200 to the host device 300 and/or the built-in universal cassette housing 500. In some arrangements, the cassette docking interface 227 may also be structured to facilitate the transfer of bills between the bill storage 226 and the host device 300 and/or the housing 500. For example and as shown in FIG. 4, the cassette docking interface 227 may be operatively coupled to the bill storage 226 such that the cassette docking interface 227 may facilitate transferring bills to and from the bill storage 226. The cassette docking interface 227 may also be operatively coupled to the bill path 318 and/or the transport apparatus 518 when the universal cassette 200 is docked with the host device 300 and/or the universal cassette housing 400 such that the cassette docking interface 227 may facilitate transferring bills to and from the bill path 318 and/or the transport apparatus 518. In some arrangements, the cassette docking interface 227 is structured to facilitate coupling to the removable universal cassette housing 700 such that the cassette docking interface is operatively coupled to the transport apparatus 718.

As briefly mentioned above, the universal cassette 200 may also include a battery 228 for powering the various components described above. The battery 228 may be any suitable rechargeable or replaceable battery, structured to provide a sufficient amount of power to operate the components of the universal cassette 200. For example, the battery 528 may be a rechargeable NiCad, NiMH, or li-ion battery. In some embodiments, when the universal cassette 200 is docked into host device 300, the battery 528 may be recharged via the battery charging subsystem 316. In other embodiments, the battery 228 is recharged via a separate or external battery charging system. For example, the battery 228 may be recharged when the universal cassette 200 is docked into an external refilling/docking station. The battery 228 may be capable of providing power to the universal cassette 200 for at least a predetermined amount of time. For example, the battery 228 may be sized to provide at least eight hours of power before being recharged, over even multiple weeks of power. Advantageously, this allows the universal cassette 200 to operate without being docked to a host device, such as by sending location updates at regular intervals when a cassette is in transit.

In some embodiments, when not docked, the universal cassette 200 sends location data and/or a battery level indication to the server 110 at regular intervals. For example, the universal cassette 200 may transmit location and battery data every hour when not connected to a host device 300. In some embodiments, the universal cassette 200 may also transmit a notification to server 110 when the cassette is undocked from a host device 300, and/or when the universal cassette 200 is undocked for a predetermined length of time. For example, the universal cassette 200 may transmit an alert, including at least location data, if the universal cassette 200 is undocked from a host device 300 for more than five minutes.

Although not shown in FIG. 4, the universal cassette 200 may also include a QR code, bar code, and/or RFID tag, used to detect the universal cassette 200 (e.g., during or after installation into a host device) and to identify a variety of information about the universal cassette 200. Said codes or tags may be positioned on an outer housing or shell of the universal cassette 200, for example, such that wireless transceivers 312 and/or image sensors 314 of host device 300 can read/scan the codes during installation or docking of the universal cassette 200.

Figure 5:
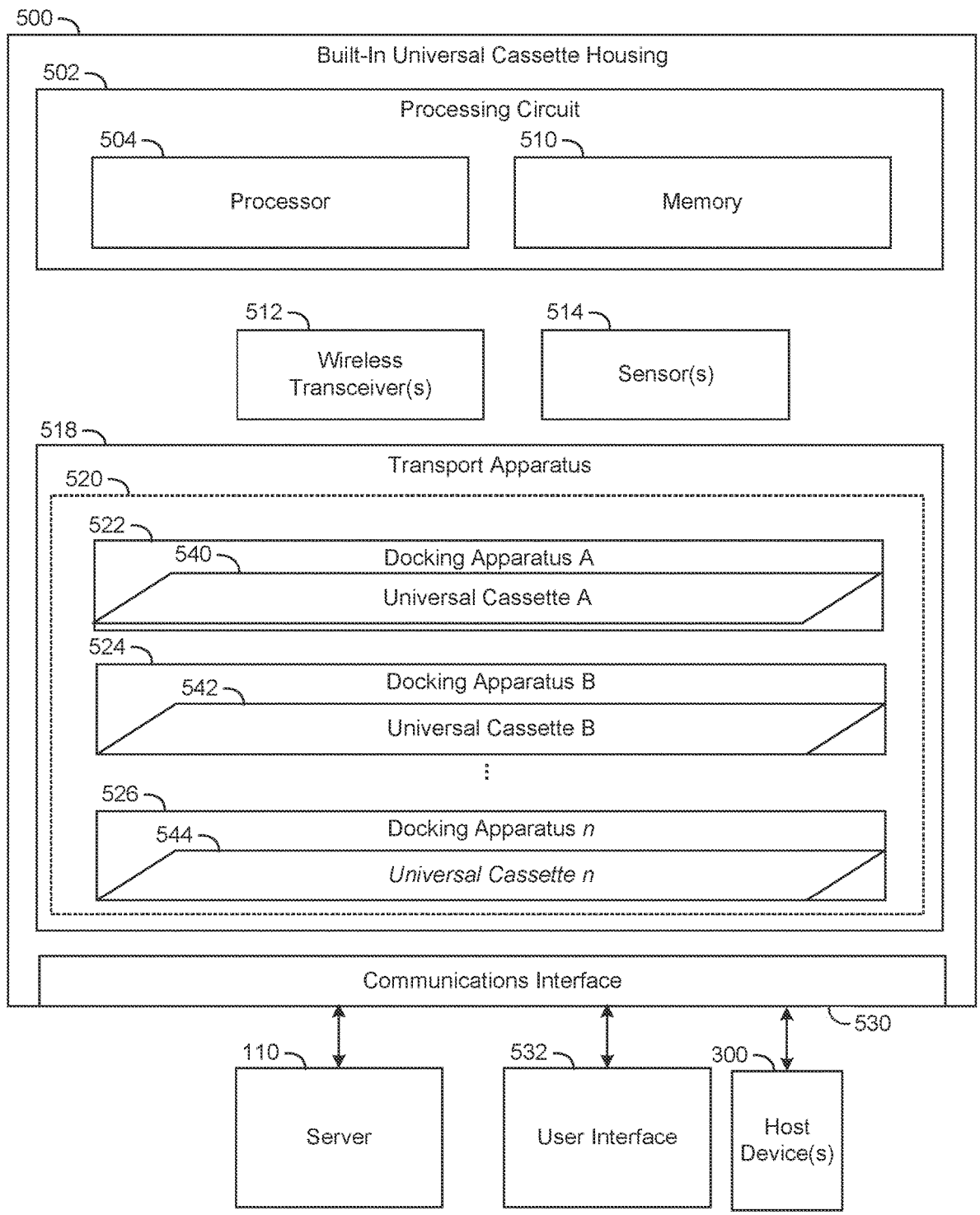
FIG. 5 is a block diagram of a built-in universal cassette housing of the cassette management system of FIG. 1, according to an example arrangement.

FIG. 5 is a block diagram of a built-in universal cassette housing 500 of the cassette management system 100 of FIG. 1, according to an example arrangement. In some embodiments, the built-in universal cassette housing 500 is structured to perform or facilitate a rebalancing operation on docked universal cassettes 200. The built-in universal cassette housing 500 may include a processing circuit 502 having a processor and 504 and memory 510, although one of skill will appreciate that various operations of the processing circuit 502 may be performed by other computing systems, such as the processing circuit 112 of the server 110, the processing circuit 302 of the host device 300, and/or the processing circuit 202 of the universal cassette 200. Accordingly, the processing circuit 502 may be omitted in part or in full. The universal cassette housing 500 also includes one or more wireless transceivers 512 and one or more sensors 514. The built-in universal cassette housing 500 includes a transport apparatus 518 that is operatively coupled to one or more docking apparatuses 520. The built-in universal cassette housing 500 also includes a communications interface 530.

In some arrangements, the built-in universal cassette housing 500 is provided with a host device 300. In these arrangements one or more of the components of the universal cassette housing 500 may be integrated with the host device 300. For example, in some arrangements, the transport apparatus 518 may be part of the bill path 318. In some arrangements, the bill path 318 may at least partially include the transport apparatus 518. Similarly, the cassette slots 320 may at least partially form the docking apparatuses 520. In some arrangements, the processing circuit 302 may at least partially form the processing circuit 502. In some arrangements, the components of the universal cassette housing 500 are substantially separate from the components of the host device 300. For example, the transport apparatus 518 may include separate rollers, belts, and the like for transporting bills within the built-in universal cassette housing 500 and/or to and from the host device 300 via the bill path 318.

The processing circuit 502 includes a processor 504 and memory 510. Together with the other components of the universal cassette housing 500, described in detail below, the processing circuit 502, the processor 504, and the memory 510 form at least a portion of a computing system for the built-in universal cassette housing 500. In some arrangements, the processing circuit 502 is substantially similar or the same as the processing circuit 302 of FIG. 3 and/or the processing circuit 112 of FIG. 2. For example, the processor 504 may be implemented as a general-purpose processor, an application specific integrated circuit (ASIC), one or more field programmable gate arrays (FPGAs), a digital signal processor (DSP), a group of processing components, or other suitable electronic processing components structured to control the operations of the built-in universal cassette housing 500.

Memory 510 (e.g., memory, memory unit, storage device, etc.) may include one or more devices (e.g., RAM, ROM, Flash memory, hard disk storage, etc.) for storing data and/or computer code for completing or facilitating the various processes, layers and modules described herein. Memory 510 may be or include volatile memory or non-volatile memory. Memory 510 may include database components, object code components, script components, or any other type of information structure for supporting the various activities and information structures described in the present application. According to an exemplary embodiment, memory 510 is communicatively connected to processor 504 via processing circuit 502 and includes computer code for executing (e.g., by processing circuit 502 and/or processor 504) one or more processes described herein.

In some arrangements, the built-in universal cassette housing 500 may advantageously track both the bill count and fill level of the universal cassettes 200 docked with the built-in universal cassette housing 500. For example, the built-in universal cassette housing 500 may utilize a similar combination of hardware and/or software utilized by the host device 300 and/or the server 110, as described above, to determine a fill level of each of the universal cassettes 200 docked with the built-in universal cassette housing 500. For example, the built-in universal cassette housing 500 may utilizes the sensors 514 to detect bills received by or dispensed by the docked universal cassettes 200 and determine the fill level of each of the docked universal cassettes 200. More specifically, as shown, the built-in universal cassette housing 500 includes one or more sensors 514. The sensors 514 may include any of a plurality of sensors for measuring various parameters associated with the operations of the built-in universal cassette housing 500. In some arrangements, the sensors 514 may include an optical sensor or other similar sensor that can count each bill as it is deposited into or received by the universal cassettes 200 docked with the built-in universal cassette housing 500. For example, as bills pass the sensors 514, the processing circuit 502 may add or subtract from a count of the total number of bills in a respective universal cassette 200.

In some embodiments, certain sensors 514 may be mounted on, or a part of, host device 300 rather than the built-in universal cassette housing 500. For example, the host device 300 and the built-in universal cassette housing 500 may share sensor data, allowing the built-in universal cassette housing 500 to utilize the sensors 514 that are external to the built-in universal cassette housing 500 to perform various functions. It will also be appreciated that sensors 514 may include any number of additional sensors not described herein. For example, sensors 514 may also include sensors for identifying bill denominations.

One of skill in the art will appreciate what various embodiments of the universal cassette housing 500 are contemplated. For example, in some embodiments, certain features of the universal cassette housing 500 may be part of the host device 300 and/or the universal cassette 200 rather than or in addition to being part of each universal cassette housing 500. For instance, in some arrangements, the processing circuit 502 may, in whole or in part, be included in the server 110 and/or the host device 300. In some embodiments, the universal cassette housing 500 may share the memory 510 and/or processor 504, which may be included in the host device 300 and/or server 110, with other components of the system 100.

Still referring to FIG. 5, the built-in universal cassette housing 500 is shown to include one or more wireless transceivers 512. The wireless transceivers 512 are substantially similar to or the same as the wireless transceivers 312 of host device 300. For example, the wireless transceivers 512 may include any device configured to transmit and receive wireless data or signals such as one or more components for communicating via VHF or UHF radio waves. In some arrangements, wireless transceivers 512 include at least a long-range and a short-range style transceiver. In some arrangements, the wireless transceivers 512 include either a long or short-range transceiver. In some arrangements, the wireless transceivers 512 include at least one of a WiFi, Bluetooth®, a cellular, or radio-frequency identification (RFID) transceiver. It will be appreciated, however, that the wireless transceivers 512 are not limited to just these examples of wireless transceiver devices/technologies, and that any type of wireless transceiver may be included in a host device 300. In some arrangements, the wireless transceivers 512 may also be coupled to, or a portion of, communications interface 530. For example, a WiFi transceiver may be utilized to communicate with other components of system 100 via communications interface 530.

The transport apparatus 518 may include one or more of gears, rollers, belts, motors, tracks, etc., for transporting bills between components of the built-in universal cassette housing 500. Specifically, bills may be transported among the docked universal cassettes 200. In some arrangements, the transport apparatus 518 may also be structured to facilitate transporting bills to and from the host device 300. As described above, the transport apparatus 518 may be at least partially part of the bill path 318.

The docking apparatuses 520 (shown as docking apparatus A 522, docking apparatus B 524, and docking apparatus n 536) are structured to receive at least one universal cassette 200. In some arrangements, the docking apparatuses 520 are cassette slots similar to the cassette slots 320. For example, as shown in FIG. 5, one or more universal cassettes 200 shown as a first universal cassette A 540, a second universal cassette B 542, and an $n^{th}$ universal cassette n 544 are docked with the built-in universal cassette housing 500. In some arrangements, the docking apparatuses 520 are part of the cassette slots 320. In these arrangements, the built-in universal cassette housing may communicatively and/or operatively couple to the docked universal cassette(s) 200 via the host device 300 (e.g., via the cassette slots 320 and/or via the bill path 318). In some arrangements, the docking apparatuses 520 are structured to facilitate coupling the universal cassettes 200 to the transport apparatus 518. In some arrangements, the docking apparatus 520 are separate docking areas that are structured to receive the universal cassettes 200. In some arrangements, the docking apparatuses 520 include a wired interface for communicatively coupling the control circuitry of the universal cassettes 200 with the processing circuit 502.

In some arrangements, the docking apparatuses 520 include one or more slots and each slot is structured to receive at least one universal cassette 200. In some arrangements, each of the slots are physically separated. In some arrangements the docking apparatus 520 are not physically separated.

The communications interface 530 is configured for transmitting and receiving various data and signals with other components of the system 100. As shown, for example, the built-in universal cassette housing 500 can communicate with at least the server 110 and the host device 300 via communications interface 530. In some arrangements, the universal cassette housing 500 can also directly communicate with the universal cassettes 200 stored in the built-in universal cassette housing 500. In some arrangements the built-in universal cassette housing 500 indirectly communicates (e.g., via the server 110 and/or the host device 300) with the universal cassettes 200. Accordingly, communications interface 530 can include a wireless network interface (e.g., 802.11X, ZigBee, Bluetooth, Internet, etc.), a wired network interface (e.g., Ethernet, USB, Thunderbolt, etc.), or any combination thereof.

In some arrangements, the built-in universal cassette housing 500 can alert the server 110 of various operational statuses of the universal cassette housing 500. For example, the built-in universal cassette housing 500 can alert the server 110 when a rebalancing operation has started, is in progress, or has finished. In another example arrangement, the universal cassette housing 500 can alert the server 110 when the processing circuit 502 has determined whether a rebalancing operation is required (e.g., if one or more of the docked universal cassettes 200 exceeds a storage threshold).

In some arrangements, the built-in universal cassette housing 500 may also communicate with additional components, such as a user interface 534. It will be appreciated, however, that the user interface 232 may be optional components depending on an embodiment of the built-in universal cassette housing 500. The user interface 534 can include an input device (e.g., a keyboard) and an output device (e.g., a screen) to allow a user to interact with the built-in universal cassette housing 500. For example, the user interface 534 may include a screen and a number or keypad that allows a user to interact directly with the universal cassette housing 500. In some embodiments, one or more components of the user interface 534 may also be utilized as part of a security interface. For example, a user may interact with a number pad of user interface 534 to enter a PIN or security access code. Accordingly, in some arrangements, the built-in universal cassette housing 500 may also include a security interface similar to the security interface 232 of FIG. 4.

In some arrangements, the built-in universal cassette housing 500 may be structured to automatically determine a rebalancing operation based on the universal cassettes 200 that are docked with the built-in universal cassette housing 500. In some arrangements, the built-in universal cassette housing 500 provides data associated with the docked universal cassettes 200 to the host device 300 such that the host device 300 at least partially determines the rebalancing operation. In some arrangements, the built-in universal cassette housing 500 provides data associated with the docked universal cassettes 200 to the server 110 such that the server 110 at least partially determines the rebalancing operation. For example, the server 110 and/or the host device 300 may at least partially determine the rebalancing operation by determining one or more rebalancing parameters. In some arrangements, the built-in universal cassette housing 500 receives an input with one or more rebalancing parameters and the built-in universal cassette housing 500 may determine the rebalancing operation based on the input. In some arrangements, the built-in universal cassette housing 500 may provide the input to the server 110 and/or the host device 300 such that the server 110 and/or the host device 300 determines the rebalancing operation based on the input. In some arrangements the input is received directly by the built-in universal cassette housing 500 (e.g., via the user interface 532). In some arrangements, the input is received from another device on the network 105 (e.g., via the server 110, via the host device 300, and/or via the user device 350). Accordingly, the rebalancing operations may be determined based on a user input or automatically determined (e.g., by the modeling engine 130).

Figure 6:
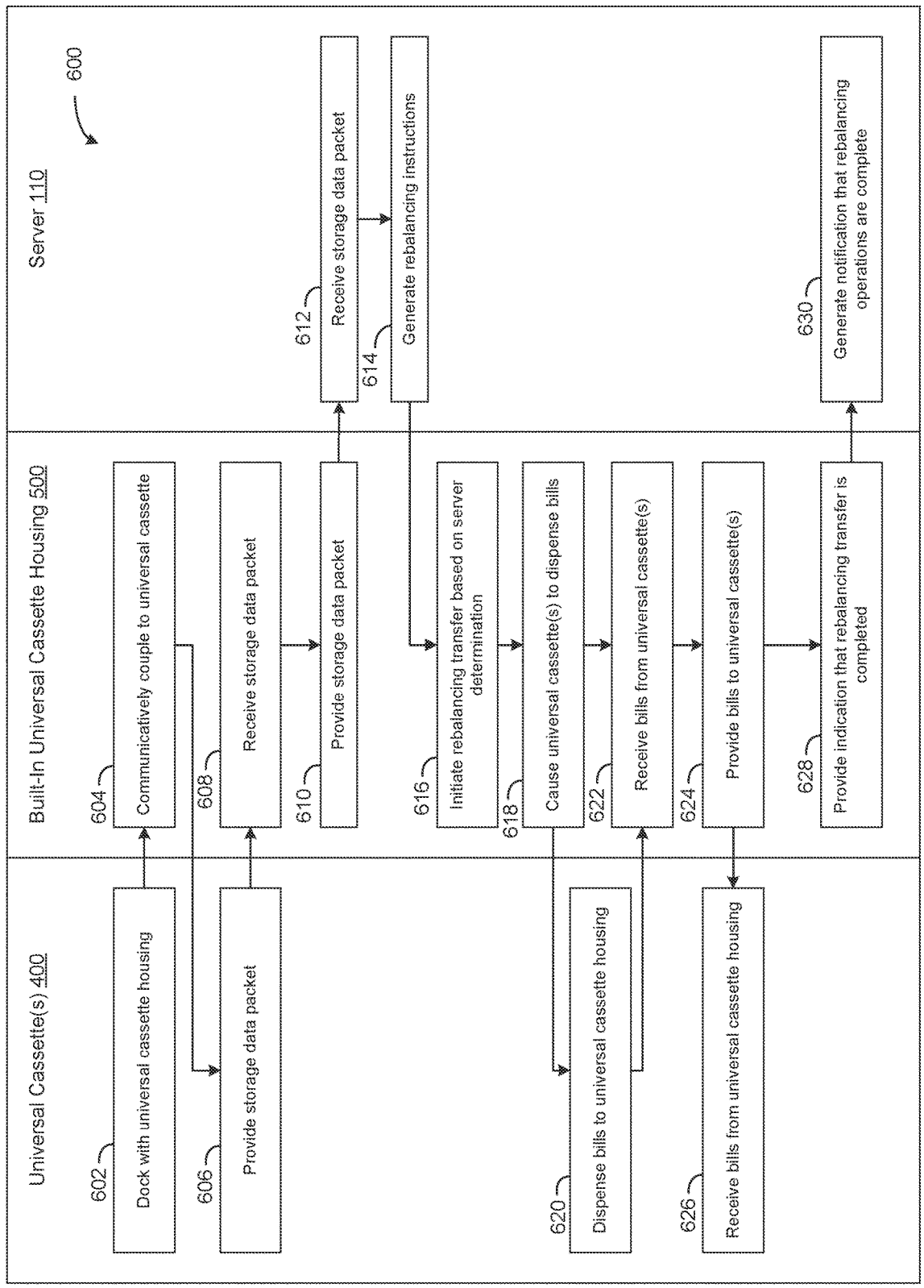
FIG. 6 is a flow diagram illustrating a process for rebalancing bills stored in the universal cassettes of FIG. 4, according to an example arrangement.

FIG. 6 is a flow diagram illustrating computer-based operations for rebalancing bills stored in the universal cassettes of FIG. 4, according to an example arrangement. In some arrangements, the process 600 is implemented by one or more components of the system 100. Specifically, certain steps of the process 600 may be implemented by the server 110, the host device 300, and/or the built-in universal cassette housing 500. It will be appreciated that certain steps of the process 600 may be optional and, in some arrangements, process 600 may be implemented using fewer than all of the steps. Additionally, one or more of the steps of the process 600 may be implemented by a different component of the system 100 than as shown in FIG. 6. For example, steps 612 and 614 may be performed by the built-in universal cassette housing 500 instead of the server 110. Additionally, the host device 300 may perform one or more of the steps shown to be performed by the built-in universal cassette housing 500 or by the server 110.

The process 600 may, advantageously, allow for a built-in universal cassette housing 500 to perform rebalancing operations with none to minimal manual input. For example, the process 600 may automatically or semi-automatically identify universal cassettes 200 that are in need of a rebalancing operation, based on a parameter such as universal cassette fill level, a predetermined time period, or other predetermined parameter. In some arrangements, the built-in universal cassette housing 500 may alert a user (e.g., a bank employee) to active the built-in universal cassette housing 500 to perform the rebalancing operations. In some arrangements, the processing circuit 502 of the built-in universal cassette housing 500 may automatically perform the rebalancing operations. For example, the memory 510 may store computer executable instructions that, when executed by the processor 504, cause the processor 504 to perform at least one of the operations included in the process 600 (e.g., the rebalancing operations). In this regard, the process 600 may ensure that the bills received by the components of the system contain an appropriate number of bills that are suitable for recycling, e.g., the bills are provided within the correct universal cassette 200 and each universal cassette 200 is not over filled or under filled. The process 600 further advantageously allows for a host device to continue to operate normally while utility operations are performed. That is, the process 600 advantageously may be performed sequentially, concurrently, or partially concurrently with regular financial transactions (e.g., a withdrawal transaction, a deposit transaction) such that the process 600 reduces interruptions or customer dissatisfaction due to waiting for a transaction to be completed (e.g., reduces or eliminates waiting time for a rebalancing operation to complete).

In brief overview of the process 600, at step 602, one or more universal cassettes 200 are docked with the built-in universal cassette housing 500. At step 604, the built-in universal cassette housing 500 communicatively couples with the docked universal cassettes 200. At step 606, the universal cassettes 200 provide storage data packets. At step 608, the built-in universal cassette housing 500 receives the storage data packs. At step 610, the built-in universal cassette housing 500 provides the storage data packets so the server 110. At step 612, the server 110 receives the storage data packet. At step 614, the server 110 determines rebalancing instructions. At step 616 the built-in universal cassette housing 500 initiates rebalancing transfer based on the server determination. At step 618, the built-in universal cassette housing 500 causes universal cassette(s) 200 to dispense banknotes. At step 620, the universal cassettes 200 dispense the banknotes. At step 622 the built-in universal cassette housing 500 receives the banknotes. At step 624 the built-in universal cassette housing 500 provides the banknotes to the universal cassettes 200. At step 626, the universal cassettes 200 receive the banknotes. At step 648, the built-in universal cassette housing 500 provides an indication that the rebalancing transfer is completed. At step 630 the server 110 generates a notification that the rebalancing operation is complete.

Referring to the process 600 in more detail, at step 602, universal cassettes 200 are connected to the built-in universal cassette housing 500. The universal cassette 200 is structured to physically and communicably couple to the built-in universal cassette housing 500 to facilitate transferring bills between the universal cassettes 200 and the built-in universal cassette housing 500 and/or to facilitate communication between the universal cassettes 200 and the built-in universal cassette housing 500, as described above. At step 604, the built-in universal cassette housing 500 communicatively couples to the universal cassettes 200. For example, the built-in universal cassette housing 500 may couple to the universal cassettes 200 via the communications interface 530 and/or the docking apparatuses 520. As part of this process, the built-in universal cassette housing 500 may execute computer-based instructions to determine the identity and/or initial fill level of the docked universal cassettes 200. For example, cassette identity may be determined based on an RFID tag or another identifier and transmitted to the server 110. The built-in universal cassette housing 500 may receive the initial fill level from the server 110 and/or directly from the universal cassette 200. In some arrangements, at step 602, the universal cassette 200 is docked with a host device 300 that is associated with the built-in universal cassette housing 500. The built-in universal cassette housing 500 may be structured to communicatively coupled to the universal cassette 200 via the host device 300, as described above.

More specifically, at step 606, the universal cassettes 200 each provide a storage data packet. The storage data packet may include a fill level, a denomination, and/or any other parameter associated with bills stored by the universal cassettes 200. In some arrangements, the storage data packet is provided to the built-in universal cassette housing 500. In some arrangements, the storage data packet is provided to the server 110.

At step 608, the built-in universal cassette housing 500 receives the storage data packet. In some arrangements, step 608 is performed by the server 110 such that the server 110 receives the storage data packet. In some arrangements, step 608 is performed by the server 110 and the built-in universal cassette housing 500 such that both of the server and the built-in universal cassette housing 500 receive the storage data packet. For example, the built-in universal cassette housing 500 may receive or access the storage data packet from the respective universal cassette 200. In some arrangements, when the universal cassette 200 is docked with and communicatively coupled with the built-in universal cassette housing 500 at steps 602 and 604, the built-in universal cassette housing 500 may be structured to directly access the memory 210 of the universal cassette 200. For example, the processing circuit 502 and/or the processor 504 may directly access the memory 210 such that the processing circuit 502 and/or the processor 504 may access data stored by the memory 210. In some arrangements, the universal cassettes 200 may not include a processing circuit 202, processor 204, and/or memory 210. In these arrangements, the built-in universal cassette housing 500 may be structured to retrieve the contents of the universal cassette 200 and perform a recognition operation of the contents, and return the contents to the universal cassette 200. For example, the recognition operation may include detecting by the sensor(s) 514 an amount of bills retrieved from the universal cassette 200 and/or one or more parameters of the bills (e.g., a denomination, a quality, etc.). In some arrangements, the built-in universal cassette housing 500 may be structured to detect and/or track (e.g., by the sensors 514) bills that are deposited or withdrawn to/from the universal cassettes 200 to determine the number of bills and/or a parameter of the bills stored by the universal cassette 200. In some arrangements, the built-in universal cassette housing 500 may be structured to detect (e.g., by the sensors 514) an identification (e.g., an RFID tag or other detectable identification) of the universal cassette 200, transmit the identification to the server 110, and receive, from the server, a fill level, denomination, and/or other parameter associated with the bills stored in the universal cassette 200. Accordingly, in some arrangements communicatively coupling to the universal cassette 200 by the built-in universal cassette housing 500 includes detecting an identifier (e.g., by the sensors 514). In some arrangements, the built-in universal cassette housing 500 may modify the storage data packet by including additional information, such as identifiers and/or fill levels for other cassettes currently docked in the built-in universal cassette housing 500.

At step 610, the built-in universal cassette housing 500 provides the storage data packet to the server 110. In some arrangements, step 610 may be omitted or skipped if the universal cassettes 200 provide the storage data packet to the server 110 or if the fill level and other information is received by the built-in universal cassette housing 500 from the server 110.

At step 612, the server 110 receives the storage data packet. In some arrangements, step 612 is performed concurrently with step 608 (e.g., when the universal cassettes 200 provide the storage data packet to the server 110 directly). In some embodiments, step 612 may be omitted.

At step 614, the server 110 generates rebalancing instructions. In some arrangements, the rebalancing instructions are generated and communicated by the server 110 to one or more controllers associated with the built-in universal cassette housing 500 (e.g., to the processing circuit 502 of the universal cassette housing, and the processing circuit 502 handles the subsequent operations described below. In some embodiments, the built-in universal cassette housing 500 may not have a controller associated therewith, and/or the server 110 may be structured to transmit the rebalancing instructions directly to the processing circuit(s) 202 of each universal cassette 200 involved in the rebalancing, where each universal cassette processing circuit 202 may handle subsequent operations described below. In some embodiments, the server 110 may be structured to transmit the rebalancing instructions to the processing circuit 302 of the host device, which may handle the subsequent operations described below by actuating electronic and/or mechanical control components associated with the housing and/or the cassettes. Furthermore, one of skill will appreciate that, according to various embodiments, the operations can be offloaded from the server 110 to the built-in universal cassette housing 500 or the host device 300, such that the server 110 is bypassed and rebalancing instructions are generated and/or performed locally on a particular host device 300.

In some arrangements, the server 110 may generate the rebalancing instructions based on the storage data packets. In some arrangements, the rebalancing instructions may override storage parameters of the universal cassettes 200. For example, the rebalancing instructions may change the denomination type stored by the universal cassette 200 or the rebalancing instructions may include storing more than one denomination type in a universal cassette 200.

In some arrangements, the rebalancing instructions are based on the storage data packets. The rebalancing instructions may include rebalancing the bills such that each of the universal cassettes 200 is between a minimum rebalancing threshold and a maximum rebalancing threshold. For example, the rebalancing instructions may keep the fill level of each of the universal cassettes 200 between a minimum of 10-25% and a maximum of 50-75%.

In some arrangements, the rebalancing instructions are based on a prediction made by the modeling engine 130. For example, the modeling engine 130 may generate a statistical prediction that a host device 300 may receive a large quantity of deposits including $10 bills. The rebalancing instructions may preemptively rebalance the bills among the universal cassettes 200 such that the host device 300 can receive the quantity of $10 bills without significant interruptions (e.g., without a predetermined number of the universal cassettes 200 reaching a maximum storage threshold). For example, the rebalancing instructions may change one or more cassettes to a different denomination type to accommodate the prediction. In another example, the modeling engine 130 may generate a statistical prediction that the host device 300 may receive a large quantity of withdrawals including $10 bills. The rebalancing instructions may preemptively rebalance the bills among the universal cassettes 200 such that the host device 300 can dispense the quantity of $10 bills without significant interruptions (e.g., without a predetermined number of the universal cassettes 200 reaching a minimum storage threshold). As briefly described above, in some arrangements the host device 300 may be structured to perform steps 612 and/or 614.

At step 616, the built-in universal cassette housing 500 initiates a rebalancing operation including a rebalancing transfer based on the server determination (e.g., the rebalancing instructions). The rebalancing operation may include operations 618-628, described below.

At step 618, the built-in universal cassette housing 500 causes a first set of the docked universal cassettes 200 to dispense bills. In some arrangements, the first set of docked universal cassettes 200 includes one or more universal cassettes 200. In some arrangements, the first set may include any universal cassettes 200 with too many bills (e.g., above a rebalancing threshold). In some arrangements, the first set may include any universal cassettes 200 that are storing a wrong type of bill (e.g., a denomination that should not be stored in the respective universal cassette 200. In some arrangements, the number of bills and/or a percentage of bills dispensed by each of the universal cassettes in the first set is determined by the server 110 at step 614 (e.g., as part of the rebalancing instructions).

At step 620, the universal cassettes 200 in the first set dispense the bills. In some embodiments, the universal cassettes 200 dispense an exact number of bills and/or a percentage of bills based on the rebalancing instructions.

At step 622, the built-in universal cassette housing 500 receives the bills dispense by the universal cassettes 200 of the first set. In some arrangements, the bills are received by the transport apparatus 518.

At step 624, the built-in universal cassette housing 500 provides bills to a second set of universal cassettes. The second set may include one or more universal cassettes 200. In some arrangements, the second set may include universal cassettes 200 with not enough bills (e.g., below a balancing threshold). In some arrangements, the second set may include universal cassettes 200 that were previously storing a wrong type of bill such that the universal cassettes 200 now store the correct type of bill (i.e., the denomination of the universal cassettes 200 changed as a result of the rebalancing operation). In some arrangements, the first set and the second set include different universal cassettes. In some arrangements, one or more of the universal cassettes 200 in the first set and the second set are same universal cassette. At step 626, the universal cassettes 200 in the second set receive the bills from the built-in universal cassette housing 500.

At step 628, the built-in universal cassette housing 500 generates and provides an indication that the rebalancing transfer is completed. The indication may also include a second storage data packet that indicates an updated fill level of each of the universal cassettes 200. In some arrangements the indication is provided to the server 110.

At step 630, the server 110 generates a notification that the rebalancing operations are complete. The notification may include the second storage data packet. The server 110 may provide the notification to a user device 350 and/or to the host device 300.

Figure 7:
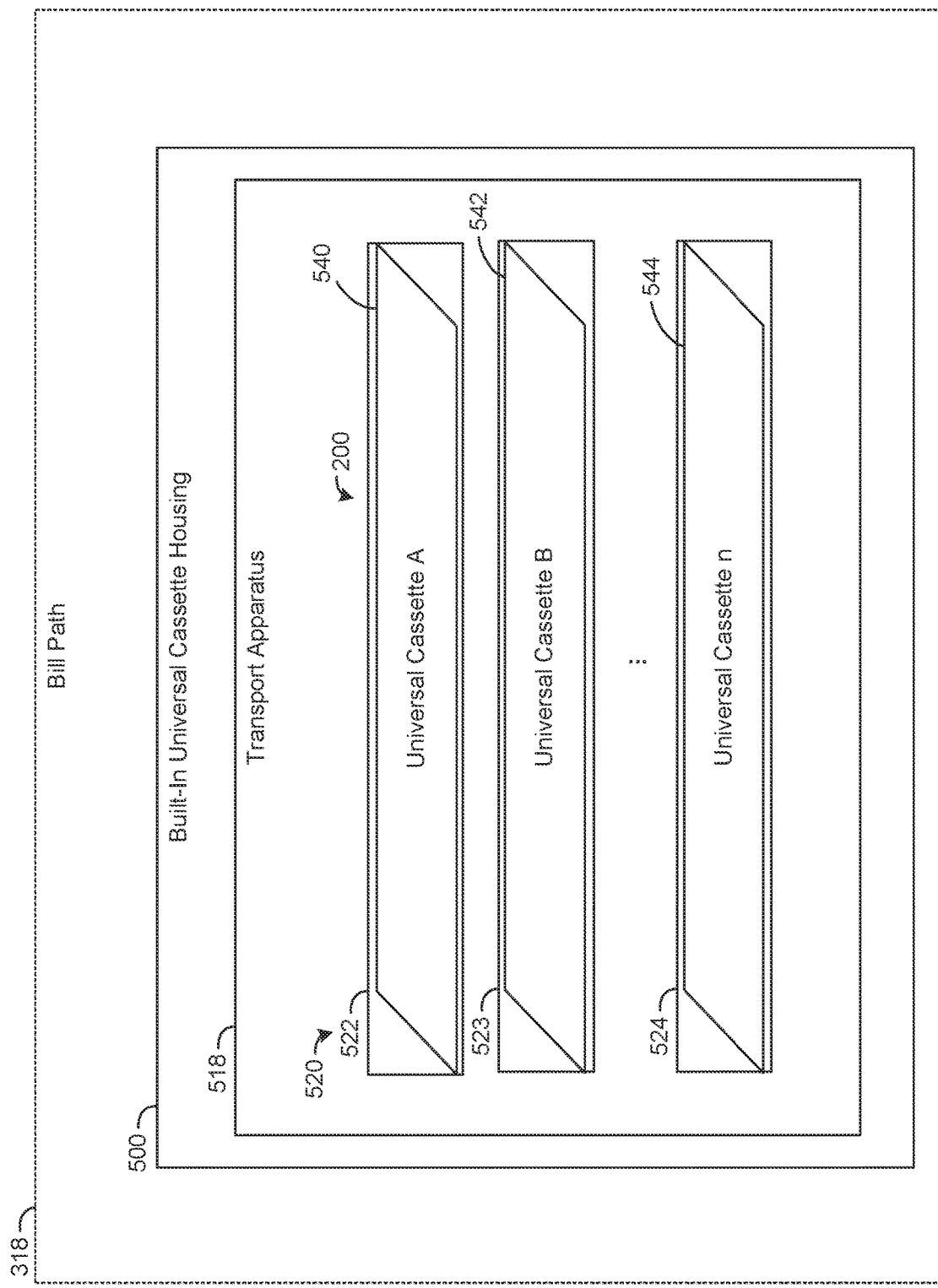
FIG. 7 is a front perspective view of the built-in universal cassette housing of FIG. 5, according to an example arrangement.

FIG. 7 is a front perspective view of the built-in universal cassette housing 500 of FIG. 5, according to an example arrangement. As shown, the built-in universal cassette housing 500 includes a transport apparatus that is operatively coupled to the bill path 318 of the host device 300. The transport apparatus 518 is operatively coupled to one or more docking apparatuses 520, each of the docking apparatuses 520 (shown as docking apparatus A 522, docking apparatus B 524, and docking apparatus n 524) may be structured to receive a universal cassette 200 (shown as universal cassette A 540, universal cassette B 542, and universal cassette n 544.

Figure 8:
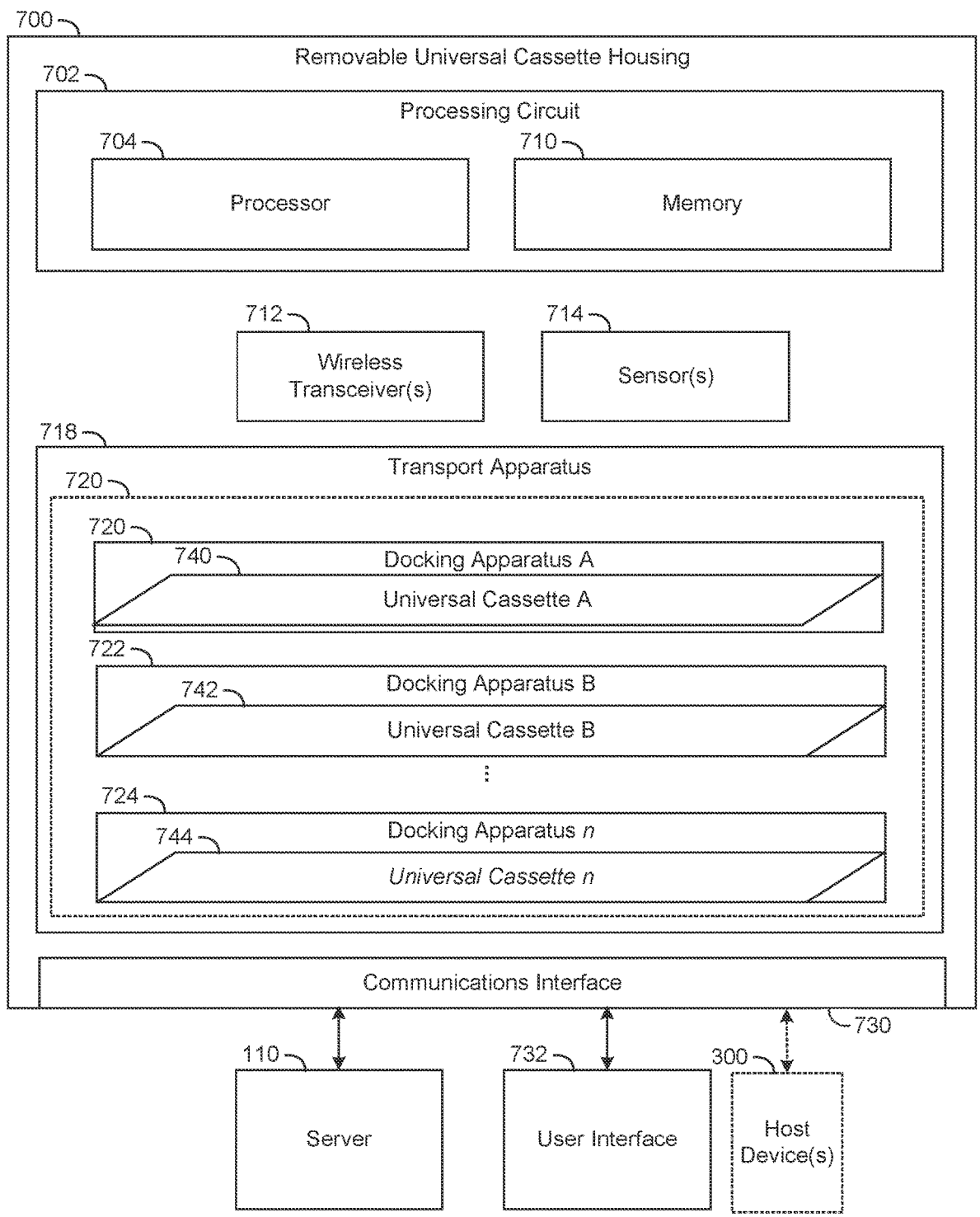
FIG. 8 is a block diagram of a removable universal cassette housing of the cassette management system of FIG. 1, according to an example arrangement.

FIG. 8 is a block diagram of a removable universal cassette housing 700 of the cassette management system 100 of FIG. 1, according to an example arrangement. In some embodiments, the removable universal cassette housing 700 is structured to perform or facilitate a rebalancing operation on docked universal cassettes 200. The removable universal cassette housing 700 may include a processing circuit 702 having a processor and 704 and memory 710, although one of skill will appreciate that various operations of the processing circuit 702 may be performed by other computing systems, such as the processing circuit 112 of the server 110, the processing circuit 302 of the host device 300, and/or the processing circuit 202 of the universal cassette 200. Accordingly, the processing circuit 702 may be omitted in part or in full. The removable universal cassette housing 700 also includes one or more wireless transceivers 712 and one or more sensors 714. The removable universal cassette housing 700 includes a transport apparatus 718 that is operatively coupled to one or more docking apparatuses 720. The removable universal cassette housing 700 also includes a communications interface 730.

In some arrangements, the removable universal cassette housing 700 may be removably coupled to a host device 300. In these arrangements one or more of the components of the removable universal cassette housing 700 may be operatively coupled to the host device 300. For example, in some arrangements, the transport apparatus 718 may operatively couple to the bill path 318. In some arrangements, the docking apparatuses 720 may be usable by the host device 300 in addition to the cassette slots 320.

The processing circuit 702 includes a processor 704 and memory 710. Together with the other components of the removable universal cassette housing 700, described in detail below, the processing circuit 702, the processor 704, and the memory 710 form at least a portion of a computing system for the removable universal cassette housing 700. In some arrangements, the processing circuit 702 is substantially similar or the same as the processing circuit 302 of FIG. 3 and/or the processing circuit 112 of FIG. 2. For example, the processor 704 may be implemented as a general-purpose processor, an application specific integrated circuit (ASIC), one or more field programmable gate arrays (FPGAs), a digital signal processor (DSP), a group of processing components, or other suitable electronic processing components structured to control the operations of the removable universal cassette housing 700.

Memory 710 (e.g., memory, memory unit, storage device, etc.) may include one or more devices (e.g., RAM, ROM, Flash memory, hard disk storage, etc.) for storing data and/or computer code for completing or facilitating the various processes, layers and modules described herein. Memory 710 may be or include volatile memory or non-volatile memory. Memory 710 may include database components, object code components, script components, or any other type of information structure for supporting the various activities and information structures described in the present application. According to an exemplary embodiment, memory 710 is communicatively connected to processor 704 via processing circuit 702 and includes computer code for executing (e.g., by processing circuit 702 and/or processor 704) one or more processes described herein.

In some arrangements, the removable universal cassette housing 700 may advantageously track both the bill count and fill level of the universal cassettes 200 docked with the removable universal cassette housing 700. For example, the removable universal cassette housing 700 may utilize a similar combination of hardware and/or software utilized by the host device 300 and/or the server 110, as described above, to determine a fill level of each of the universal cassettes 200 docked with the removable universal cassette housing 700. For example, the removable universal cassette housing 700 may utilizes the sensors 714 to detect bills received by or dispensed by the docked universal cassettes 200 and determine the fill level of each of the docked universal cassettes 200. More specifically, as shown, the removable universal cassette housing 700 includes one or more sensors 714. The sensors 714 may include any of a plurality of sensors for measuring various parameters associated with the operations of the removable universal cassette housing 700. In some arrangements, the sensors 714 may include an optical sensor or other similar sensor that can count each bill as it is deposited into or received by the universal cassettes 200 docked with the removable universal cassette housing 700. For example, as bills pass the sensors 714, the processing circuit 702 may add or subtract from a count of the total number of bills in a respective universal cassette 200.

In some embodiments, certain sensors 714 may be mounted on, or a part of, host device 300 rather than the removable universal cassette housing 700. For example, the host device 300 and the removable universal cassette housing 700 may share sensor data, allowing the removable universal cassette housing 700 to utilize the sensors 714 that are external to the removable universal cassette housing 700 to perform various functions. It will also be appreciated that sensors 714 may include any number of additional sensors not described herein. For example, sensors 714 may also include sensors for identifying bill denominations.

One of skill in the art will appreciate what various embodiments of the removable universal cassette housing 700 are contemplated. For example, in some embodiments, the removable universal cassette housing 700 may be implemented as a stand-alone device. In some arrangements, the removable universal cassette housing may be controlled by a remote computing system such as the server 110. For instance, in some arrangements, the processing circuit 702 may, in whole or in part, be included in the server 110.

Still referring to FIG. 8, the removable universal cassette housing 700 is shown to include one or more wireless transceivers 712. The wireless transceivers 712 are substantially similar to or the same as the wireless transceivers 312 of host device 300 and/or the wireless transceivers 512 of the built-in universal cassette housing 500. For example, the wireless transceivers 712 may include any device configured to transmit and receive wireless data or signals such as one or more components for communicating via VHF or UHF radio waves. In some arrangements, wireless transceivers 712 include at least a long-range and a short-range style transceiver. In some arrangements, the wireless transceivers 712 include either a long or short-range transceiver. In some arrangements, the wireless transceivers 712 include at least one of a WiFi, Bluetooth®, a cellular, or radio-frequency identification (RFID) transceiver. It will be appreciated, however, that the wireless transceivers 712 are not limited to just these examples of wireless transceiver devices/technologies, and that any type of wireless transceiver may be included in the removable universal cassette housing 700. In some arrangements, the wireless transceivers 712 may also be coupled to, or a portion of, communications interface 730. For example, a WiFi transceiver may be utilized to communicate with other components of system 100 via communications interface 730.

The transport apparatus 718 may include one or more of gears, rollers, belts, motors, tracks, etc., for transporting bills between components of the removable universal cassette housing 700. Specifically, bills may be transported among the docked universal cassettes 200. In some arrangements, the transport apparatus 718 is operatively coupled to an escrow area (not shown). The escrow area may be structured to temporarily store bills during a rebalancing operation. For example, the rebalancing operation may include a first set of bills being transferred from a first universal cassette to a second universal cassette and a second set of bills being transferred from the second universal cassette to the first universal cassette. The escrow area may be structured to temporarily store one or more of the first set of bills and the second set of bills during the rebalancing operation.

The docking apparatuses 720 (shown as docking apparatus A 722, docking apparatus B 724, and docking apparatus n 736) are structured to receive at least one universal cassette 200. In some arrangements, the docking apparatuses 720 are cassette slots similar to the cassette slots 320. For example, as shown in FIG. 5, one or more universal cassettes 200 shown as a first universal cassette A 740, a second universal cassette B 742, and an $n^{th}$ universal cassette n 744 are docked with the removable universal cassette housing 700. In some arrangements, the docking apparatuses 720 are part of the cassette slots 320. In these arrangements, the built-in universal cassette housing may communicatively and/or operatively couple to the docked universal cassette(s) 200 via the host device 300 (e.g., via the cassette slots 320 and/or via the bill path 318). In some arrangements, the docking apparatuses 720 are structured to facilitate coupling the universal cassettes 200 to the transport apparatus 718. In some arrangements, the docking apparatus 720 are separate docking areas that are structured to receive the universal cassettes 200. In some arrangements, the docking apparatuses 720 include a wired interface for communicatively coupling the control circuitry of the universal cassettes 200 with the processing circuit 702.

In some arrangements, the docking apparatuses 720 include one or more slots and each slot is structured to receive at least one universal cassette 200. In some arrangements, each of the slots are physically separated. In some arrangements the docking apparatus 720 are not physically separated such that the docking apparatus A 720, docking apparatus B 722, and docking apparatus n 724 are a singular entity.

The communications interface 730 is configured for transmitting and receiving various data and signals with other components of the system 100. As shown, for example, the removable universal cassette housing 700 can communicate with at least the server 110 via communications interface 730. In some arrangements, the removable universal cassette housing 700 can also directly communicate with the universal cassettes 200 stored in the removable universal cassette housing 700. In some arrangements the removable universal cassette housing 700 indirectly communicates (e.g., via the server 110) with the universal cassettes 200. Accordingly, communications interface 730 can include a wireless network interface (e.g., 802.11X, ZigBee, Bluetooth, Internet, etc.), a wired network interface (e.g., Ethernet, USB, Thunderbolt, etc.), or any combination thereof.

In some arrangements, the removable universal cassette housing 700 can alert the server 110 of various operational statuses of the removable universal cassette housing 700. For example, the removable universal cassette housing 700 can alert the server 110 when a rebalancing operation has started, is in progress, or has finished. In another example arrangement, the removable universal cassette housing 700 can alert the server 110 when the processing circuit 702 has determined whether a rebalancing operation is required (e.g., if one or more of the docked universal cassettes 200 exceeds a storage threshold).

In some arrangements, the removable universal cassette housing 700 may also communicate with additional components, such as a user interface 734. It will be appreciated, however, that the user interface 232 may be optional components depending on an embodiment of the removable universal cassette housing 700. The user interface 734 can include an input device (e.g., a keyboard) and an output device (e.g., a screen) to allow a user to interact with the removable universal cassette housing 700. For example, the user interface 734 may include a screen and a number or keypad that allows a user to interact directly with the removable universal cassette housing 700. In some embodiments, one or more components of the user interface 734 may also be utilized as part of a security interface. For example, a user may interact with a number pad of user interface 734 to enter a PIN or security access code. Accordingly, in some arrangements, the removable universal cassette housing 700 may also include a security interface similar to the security interface 232 of FIG. 4.

In some arrangements, the removable universal cassette housing 700 may be structured to automatically determine a rebalancing operation based on the universal cassettes 200 that are docked with the removable universal cassette housing 700. In some arrangements, the removable universal cassette housing 700 provides data associated with the docked universal cassettes 200 to the server 110 such that the server 110 at least partially determines the rebalancing operation. For example, the server 110 may at least partially determine the rebalancing operation by determining one or more rebalancing parameters. In some arrangements, the removable universal cassette housing 700 receives an input with one or more rebalancing parameters and the removable universal cassette housing 700 may determine the rebalancing operation based on the input. In some arrangements, the removable universal cassette housing 700 may provide the input to the server 110 such that the server 110 determines the rebalancing operation based on the input. In some arrangements the input is received directly by the removable universal cassette housing 700 (e.g., via the user interface 732). In some arrangements, the input is received from another device on the network 105 (e.g., via the server 110, and/or via the user device 350). Accordingly, the rebalancing operations may be determine based on a user input or automatically determined (e.g., by the modeling engine 130).

Figure 9:
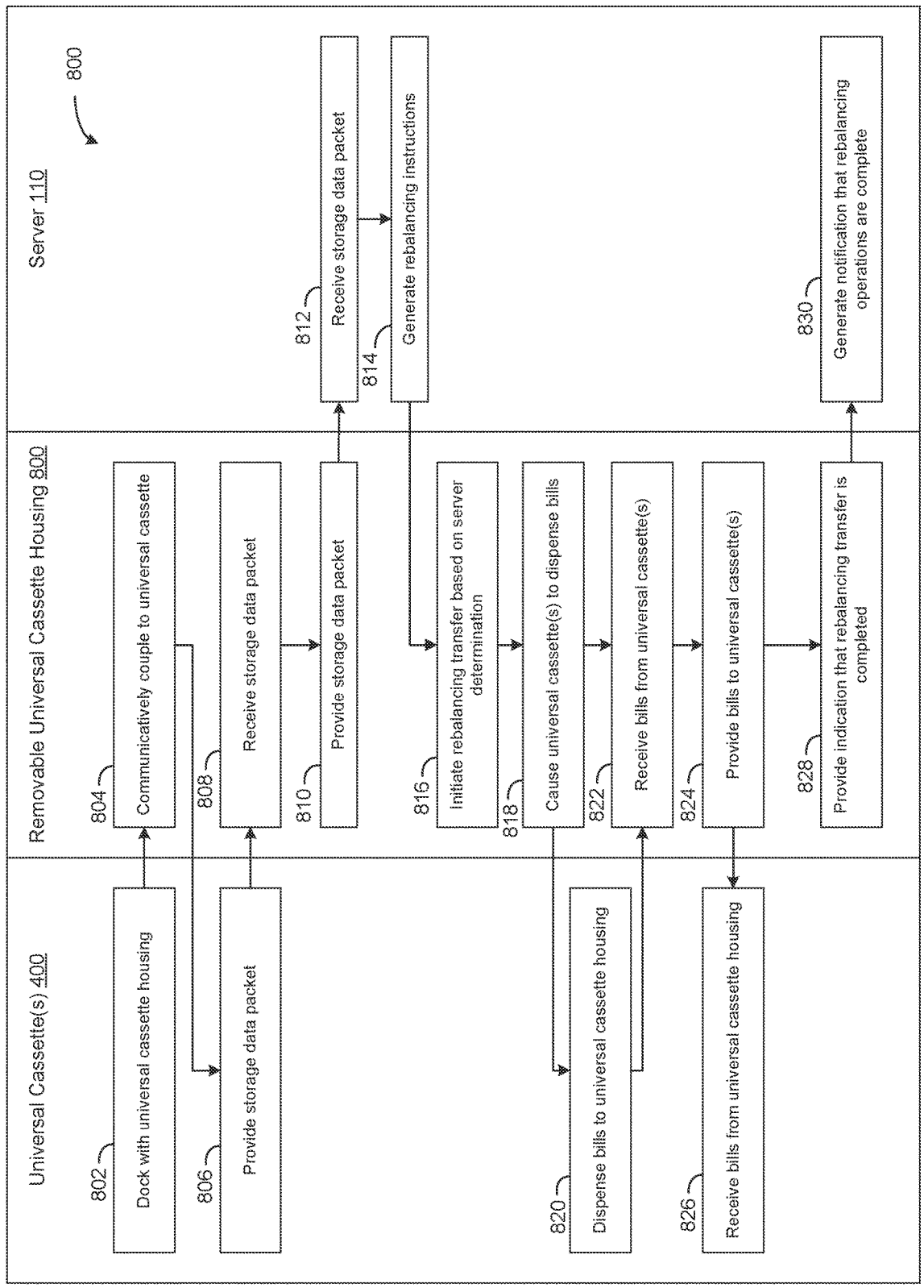
FIG. 9 is a flow diagram illustrating a process for rebalancing bills stored in the universal cassettes of FIG. 4, according to an example arrangement.

FIG. 9 is a flow diagram illustrating a process 800 for rebalancing bills stored in the universal cassettes 200 of FIG. 4, according to an example arrangement. In some arrangements, the process 800 is implemented by one or more components of the system 100. Specifically, certain steps of the process 800 may be implemented by the server 110, the host device 300, and/or the removable universal cassette housing 700. It will be appreciated that certain steps of the process 800 may be optional and, in some arrangements, process 800 may be implemented using fewer than all of the steps. Additionally, one or more of the steps of the process 800 may be implemented by a different component of the system 100 than as shown in FIG. 6. For example, steps 812 and 814 may be performed by the removable universal cassette housing 700 instead of the server 110.

The process 800 may, advantageously, allow for a removable universal cassette housing 700 to perform rebalancing operations with none to minimal manual input. For example, the process 800 may automatically or semi-automatically identify universal cassettes 200 that are in need of a rebalancing operation, based on a parameter such as universal cassette fill level, a predetermined time period, or other predetermined parameter. In some arrangements, the removable universal cassette housing 700 may alert a user (e.g., a bank employee) to active the removable universal cassette housing 700 to perform the rebalancing operations. In some arrangements, the processing circuit 702 of the removable universal cassette housing 700 may automatically perform the rebalancing operations. For example, the memory 710 may store computer executable instructions that, when executed by the processor 704, cause the processor 704 to perform at least one of the operations included in the process 800 (e.g., the rebalancing operations). In this regard, the process 800 may ensure that the bills received by the components of the system contain an appropriate number of bills that are suitable for recycling, e.g., the bills are provided within the correct universal cassette 200 and each universal cassette 200 is not over filled or under filled.

In brief overview of the process 800, at step 802, one or more universal cassettes 200 are docked with the removable universal cassette housing 700. At step 804, the removable universal cassette housing 700 communicatively couples with the docked universal cassettes 200. At step 806, the universal cassettes 200 provide storage data packets. At step 808, the removable universal cassette housing 700 receives the storage data packs. At step 810, the removable universal cassette housing 700 provides the storage data packets so the server 110. At step 812, the server 110 receives the storage data packet. At step 814, the server 110 determines rebalancing instructions. At step 816 the removable universal cassette housing 700 initiates rebalancing transfer based on the server determination. At step 818, the removable universal cassette housing 700 causes universal cassette(s) 200 to dispense banknotes. At step 820, the universal cassettes 200 dispense the banknotes. At step 822 the removable universal cassette housing 700 receives the banknotes. At step 824 the removable universal cassette housing 700 provides the banknotes to the universal cassettes 200. At step 826, the universal cassettes 200 receive the banknotes. At step 648, the removable universal cassette housing 700 provides an indication that the rebalancing transfer is completed. At step 830 the server 110 generates a notification that the rebalancing operation is complete.

Referring to the process 800 in more detail, at step 802, universal cassettes 200 are connected to the removable universal cassette housing 700. The universal cassette 200 is structured to physically and communicably couple to the removable universal cassette housing 700 to facilitate transferring bills between the universal cassettes 200 and the removable universal cassette housing 700 and/or to facilitate communication between the universal cassettes 200 and the removable universal cassette housing 700, as described above. At step 804, the removable universal cassette housing 700 communicatively couples to the universal cassettes 200. For example, the removable universal cassette housing 700 may couple to the universal cassettes 200 via the communications interface 730 and/or the docking apparatuses 720. As part of this process, the removable universal cassette housing 700 may execute computer-based instructions to determine the identity and/or initial fill level of the docked universal cassettes 200. For example, cassette identity may be determined based on an RFID tag or another identifier and transmitted to the server 110. The removable universal cassette housing 700 may receive the initial fill level from the server 110 and/or directly from the universal cassette 200.

More specifically, at step 806, the universal cassettes 200 each provide a storage data packet. The storage data packet may include a fill level, a denomination, and/or any other parameter associated with bills stored by the universal cassettes 200. In some arrangements, the storage data packet is provided to the removable universal cassette housing 700. In some arrangements, the storage data packet is provided to the server 110.

At step 808, the removable universal cassette housing 700 receives the storage data packet. In some arrangements, step 808 is performed by the server 110 such that the server 110 receives the storage data packet. In some arrangements, step 808 is performed by the server 110 and the removable universal cassette housing 700 such that both of the server and the removable universal cassette housing 700 receive the storage data packet. For example, the removable universal cassette housing 700 may receive or access the storage data packet from the respective universal cassette 200. In some arrangements, when the universal cassette 200 is docked with and communicatively coupled with the removable universal cassette housing 700 at steps 802 and 804, the removable universal cassette housing 700 may be structured to directly access the memory 210 of the universal cassette 200. For example, the processing circuit 702 and/or the processor 704 may directly access the memory 210 such that the processing circuit 702 and/or the processor 704 may access data stored by the memory 210. In some arrangements, the universal cassettes 200 may not include a processing circuit 202, processor 204, and/or memory 210. In these arrangements, the removable universal cassette housing 700 may be structured to retrieve the contents of the universal cassette 200 and perform a recognition operation of the contents, and return the contents to the universal cassette 200. For example, the recognition operation may include detecting by the sensor(s) 714 an amount of bills retrieved from the universal cassette 200 and/or one or more parameters of the bills (e.g., a denomination, a quality, etc.). In some arrangements, the removable universal cassette housing 700 may be structured to detect and/or track (e.g., by the sensors 714) bills that are deposited or withdrawn to/from the universal cassettes 200 to determine the number of bills and/or a parameter of the bills stored by the universal cassette 200. In some arrangements, the removable universal cassette housing 700 may be structured to detect (e.g., by the sensors 714) an identification (e.g., an RFID tag or other detectable identification) of the universal cassette 200, transmit the identification to the server 110, and receive, from the server, a fill level, denomination, and/or other parameter associated with the bills stored in the universal cassette 200. Accordingly, in some arrangements communicatively coupling to the universal cassette 200 by the removable universal cassette housing 700 includes detecting an identifier (e.g., by the sensors 714). In some arrangements, the removable universal cassette housing 700 may modify the storage data packet by including additional information, such as identifiers and/or fill levels for other cassettes currently docked in the removable universal cassette housing 700.

At step 810, the removable universal cassette housing 700 provides the storage data packet to the server 110. In some arrangements, step 810 may be omitted or skipped if the universal cassettes 200 provide the storage data packet to the server 110 or if the fill level and other information is received by the removable universal cassette housing 700 from the server 110.

At step 812, the server 110 receives the storage data packet. In some arrangements, step 812 is performed concurrently with step 808 (e.g., when the universal cassettes 200 provide the storage data packet to the server 110 directly). In some embodiments, step 812 may be omitted.

At step 814, the server 110 generates rebalancing instructions. In some arrangements, the rebalancing instructions are generated and communicated by the server 110 to one or more controllers associated with the removable universal cassette housing 700 (e.g., to the processing circuit 702 of the universal cassette housing, and the processing circuit 702 handles the subsequent operations described below. In some embodiments, the removable universal cassette housing 700 may not have a controller associated therewith, and/or the server 110 may be structured to transmit the rebalancing instructions directly to the processing circuit(s) 202 of each universal cassette 200 involved in the rebalancing, where each universal cassette processing circuit 202 may handle subsequent operations described below. In some embodiments, the server 110 may be structured to transmit the rebalancing instructions to the processing circuit 302 of the host device, which may handle the subsequent operations described below by actuating electronic and/or mechanical control components associated with the housing and/or the cassettes. Furthermore, one of skill will appreciate that, according to various embodiments, the operations can be offloaded from the server 110 to the removable universal cassette housing 700 such that the server 110 is bypassed and rebalancing instructions are generated and/or performed locally at a removable universal cassette housing 700.

In some arrangements, the server 110 may generate the rebalancing instructions based on the storage data packets. In some arrangements, the rebalancing instructions may override storage parameters of the universal cassettes 200. For example, the rebalancing instructions may change the denomination type stored by the universal cassette 200 or the rebalancing instructions may include storing more than one denomination type in a universal cassette 200.

In some arrangements, the rebalancing instructions are based on the storage data packets. The rebalancing instructions may include rebalancing the bills such that each of the universal cassettes 200 is between a minimum rebalancing threshold and a maximum rebalancing threshold. For example, the rebalancing instructions may keep the fill level of each of the universal cassettes 200 between a minimum of 10-25% and a maximum of 70-75%.

In some arrangements, the rebalancing instructions are based on a prediction made by the modeling engine 130. For example, the modeling engine 130 may generate a statistical prediction that a host device 300 that is associated with a removable universal cassette housing 700 may receive a large quantity of deposits including $10 bills. The rebalancing instructions may preemptively rebalance the bills among the universal cassettes 200 at the removable universal cassette housing 700 such that the host device 300 can receive the universal cassettes 200 with the quantity of $10 bills without significant interruptions (e.g., without a predetermined number of the universal cassettes 200 reaching a maximum storage threshold). For example, the rebalancing instructions may change one or more cassettes to a different denomination type to accommodate the prediction. In another example, the modeling engine 130 may generate a statistical prediction that the host device 300 associated with the removable universal cassette housing 700 may receive a large quantity of withdrawals including $10 bills. The rebalancing instructions may preemptively rebalance the bills among the universal cassettes 200 at the removable universal cassette housing 700 such that the host device 300 can dispense the quantity of $10 bills without significant interruptions (e.g., without a predetermined number of the universal cassettes 200 reaching a minimum storage threshold).

At step 816, the removable universal cassette housing 700 initiates a rebalancing operation including a rebalancing transfer based on the server determination (e.g., the rebalancing instructions). The rebalancing operation may include operations 818-828, described below.

At step 818, the removable universal cassette housing 700 causes a first set of the docked universal cassettes 200 to dispense bills. In some arrangements, the first set of docked universal cassettes 200 includes one or more universal cassettes 200. In some arrangements, the first set may include any universal cassettes 200 with too many bills (e.g., above a rebalancing threshold). In some arrangements, the first set may include any universal cassettes 200 that are storing a wrong type of bill (e.g., a denomination that should not be stored in the respective universal cassette 200. In some arrangements, the number of bills and/or a percentage of bills dispensed by each of the universal cassettes in the first set is determined by the server 110 at step 814 (e.g., as part of the rebalancing instructions).

At step 820, the universal cassettes 200 in the first set dispense the bills. In some embodiments, the universal cassettes 200 dispense an exact number of bills and/or a percentage of bills based on the rebalancing instructions.

At step 822, the removable universal cassette housing 700 receives the bills dispense by the universal cassettes 200 of the first set. In some arrangements, the bills are received by the transport apparatus 718.

At step 824, the removable universal cassette housing 700 provides bills to a second set of universal cassettes. The second set may include one or more universal cassettes 200. In some arrangements, the second set may include universal cassettes 200 with not enough bills (e.g., below a balancing threshold). In some arrangements, the second set may include universal cassettes 200 that were previously storing a wrong type of bill such that the universal cassettes 200 now store the correct type of bill (i.e., the denomination of the universal cassettes 200 changed as a result of the rebalancing operation). In some arrangements, the first set and the second set include different universal cassettes. In some arrangements, one or more of the universal cassettes 200 in the first set and the second set are same universal cassette. At step 826, the universal cassettes 200 in the second set receive the bills from the removable universal cassette housing 700.

At step 828, the removable universal cassette housing 700 generates and provides an indication that the rebalancing transfer is completed. The indication may also include a second storage data packet that indicates an updated fill level of each of the universal cassettes 200. In some arrangements the indication is provided to the server 110.

At step 830, the server 110 generates a notification that the rebalancing operations are complete. The notification may include the second storage data packet. The server 110 may provide the notification to a user device 350 and/or to the host device 300.

Figure 10:
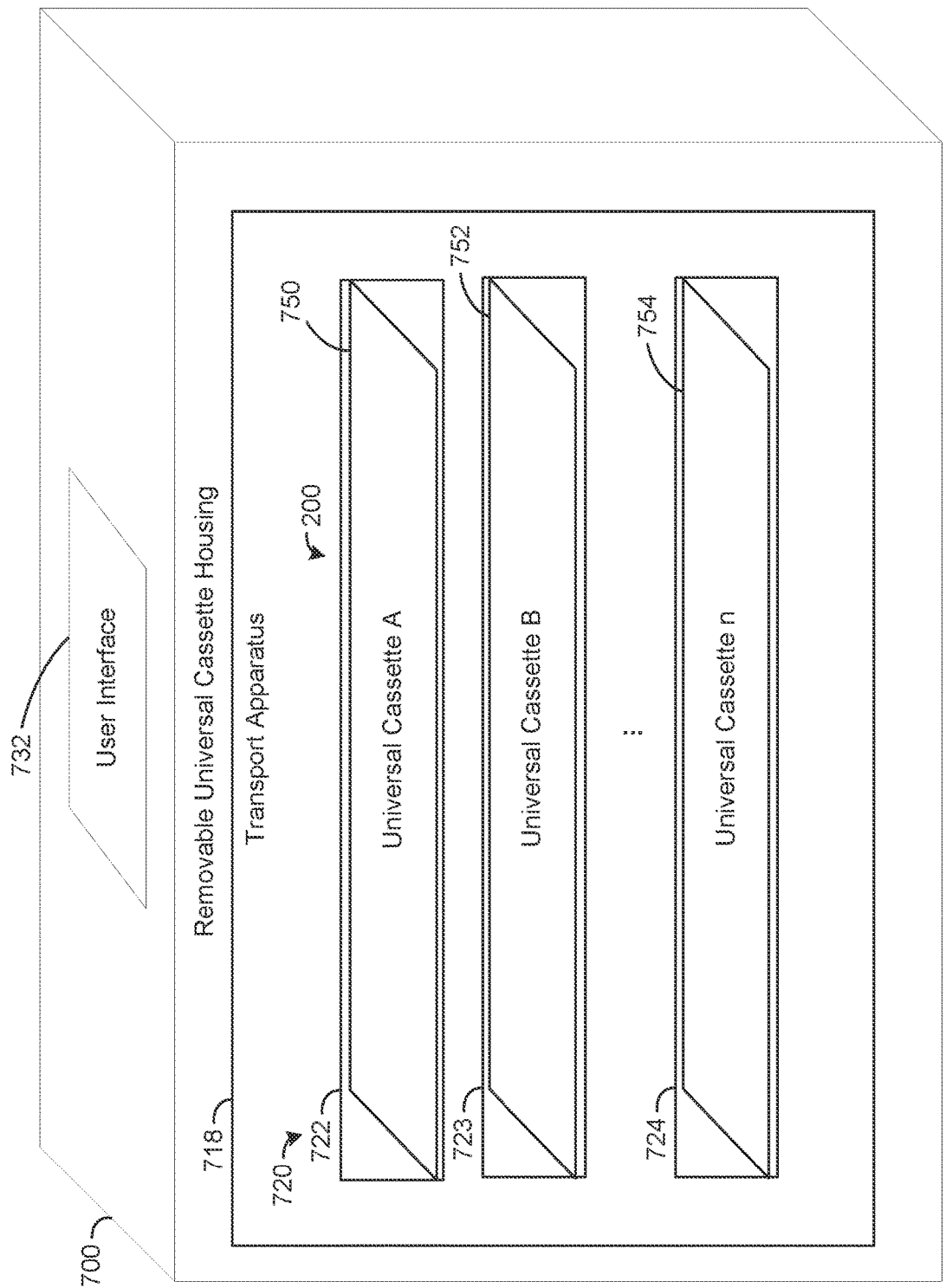
FIG. 10 is a front perspective view of the removable universal cassette housing of the cassette management system of FIG. 1, according to an example arrangement.

FIG. 10 is a front perspective view of the removable universal cassette housing 700 of the cassette management system 100 of FIG. 1, according to an example arrangement. As shown, the removable universal cassette housing 700 includes a transport apparatus 718 that is operatively coupled to one or more docking apparatuses 720, each of the docking apparatuses 720 (shown as docking apparatus A 722, docking apparatus B 724, and docking apparatus n 724) may be structured to receive a universal cassette 200 (shown as universal cassette A 740, universal cassette B 742, and universal cassette n 744. As shown the removable universal cassette housing 700 also includes a user interface 732 that is provided on a first surface such that a user may interact with the removable universal cassette housing 700 via the user interface 732.

According to various embodiments, the removable universal cassette housing 700 may be structured to couple to a host device in any suitable manner. For instance, in some embodiments, the removable universal cassette housing may be structured to couple to the host device via one or more interface ports disposed in the safe area of the host device. In some embodiments, the removable universal cassette housing may be structured to couple to the host device via one or more interface ports disposed on the exterior of the host device (e.g., via a port located on any suitable outer surface of the host device, such as side, front, top, etc.). In some embodiments, a receiving area within the host device include rails or a similar component, such that the removable universal cassette housing 700 can be installed and removed in a slidable fashion. One of skill will appreciate that all suitable configurations are contemplated herein.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A universal cassette housing for storing banknotes, the universal cassette housing comprising:
    a first docking element structured to receive a first universal cassette;
    a second docking element structured to receive a second universal cassette;
    a transport apparatus structured to facilitate transferring banknotes between the first universal cassette and the second universal cassette;
    a housing computing system comprising a processing circuit including one or more processors and memory, the memory storing instructions that, when executed by the one or more processors, cause the housing computing system to perform operations comprising:
        receiving information regarding banknotes stored in the first universal cassette;
        receiving information regarding banknotes stored in the second universal cassette; and
        causing the transport apparatus to initiate a transfer of one or more of the banknotes between the first universal cassette and the second universal cassette based on the information regarding the banknotes stored in the first universal cassette and the information regarding the banknotes stored in the second universal cassette.

2. The universal cassette housing of claim 1, wherein the operations further comprise receiving a rebalancing parameter, wherein causing the transport apparatus to initiate the transfer is further based on the rebalancing parameter.

3. The universal cassette housing of claim 2, wherein the rebalancing parameter comprises at least one of:
    a geographical location of the universal cassette housing;
    a destination of the first universal cassette;
    a destination of the second universal cassette;
    a time of day; or
    a projected demand of the banknotes.

4. The universal cassette housing of claim 1, wherein the information regarding the banknotes stored in the first universal cassette comprises at least one of a number of the banknotes stored in the first universal cassette or a denomination of each of the banknotes stored in the first universal cassette.

5. The universal cassette housing of claim 1, wherein the operations further comprise:
    causing the first universal cassette to dispense a first set of the banknotes, wherein the first set of the banknotes is received by the transport apparatus; and
    causing the second universal cassette to receive the first set of the banknotes from the transport apparatus.

6. The universal cassette housing of claim 5, wherein the operations further comprise:
    causing the second universal cassette to dispense a second set of the banknotes, wherein the second set of the banknotes is received by the transport apparatus; and
    causing the first universal cassette to receive the second set of the banknotes from the transport apparatus.

7. The universal cassette housing of claim 6, wherein at least one of:
    a first quantity of the banknotes in the first set of the banknotes is less than a first total quantity of banknotes in the first universal cassette, or
    a second quantity of banknotes in the second set of the banknotes is less than a second total quantity of banknotes in the second universal cassette.

8. The universal cassette housing of claim 1, further comprising an escrow area accessible by the transport apparatus and structured to receive and temporarily store the banknotes within the universal cassette housing during the transfer of the banknotes.

9. The universal cassette housing of claim 1, further comprising a user interface apparatus structured to receive a user input and provide an output;
    wherein causing the transport apparatus to initiate the transfer of one or more of the banknotes is further based on the user input; and
    wherein the output includes a notification indicating that the transfer of the banknotes is complete.

10. A method of rebalancing banknotes in a transaction system, the method comprising:
    receiving, by a computing system, information regarding banknotes stored in a first universal cassette;
    receiving, by the computing system, information regarding banknotes stored in a second universal cassette; and
    causing, by the computing system, a transport apparatus to initiate a transfer of one or more of the banknotes between the first universal cassette and the second universal cassette based on the information regarding the banknotes stored in the first universal cassette and the information regarding the banknotes stored in the second universal cassette, wherein the transport apparatus is disposed within a universal cassette housing, the universal cassette housing coupled to the first universal cassette and the second universal cassette.

11. The method of claim 10, further comprising receiving a rebalancing parameter, wherein causing the transport apparatus to initiate the transfer is further based on the rebalancing parameter.

12. The method of claim 11, wherein the rebalancing parameter is based on at least one of:
    a geographical location of the universal cassette housing;
    a destination of the first universal cassette;
    a destination of the second universal cassette;
    a time of day; or
    a projected demand of the banknotes.

13. The method of claim 10, wherein the information regarding the banknotes stored in the first universal cassette comprises at least one of a number of the banknotes stored in the first universal cassette or a denomination of each of the banknotes stored in the first universal cassette.

14. The method of claim 10, further comprising:
    causing, by the computing system, the first universal cassette to dispense a first set of the banknotes, the first set of the banknotes received by the transport apparatus; and causing, by the computing system, the second universal cassette to receive the first set of the banknotes from the transport apparatus.

15. The method of claim 14, further comprising:

causing, by the computing system, the second universal cassette to dispense a second set of the banknotes, wherein the second set of the banknotes is received by the transport apparatus; and causing, by the computing system, the first universal cassette to receive the second set of the banknotes from the transport apparatus.

16. The method of claim 15, wherein at least one of:

a first quantity of the banknotes in the first set of the banknotes is less than a first total quantity of banknotes in the first universal cassette, or a second quantity of banknotes in the second set of the banknotes is less than a second total quantity of banknotes in the second universal cassette.

17. The method of claim 10, further comprising:

receiving a user input via a user interface apparatus, wherein causing the transport apparatus to initiate the transfer of one or more of the banknotes is further based on the user input; and displaying a notification indicating that the transfer of the banknotes is complete via the user interface apparatus.

18. A non-transitory computer-readable media having computer-executable instructions embodied therein that, when executed by one or more processors of a computing system, cause the computing system to perform operations comprising:

receiving information regarding banknotes stored in a first universal cassette;

receiving information regarding banknotes stored in a second universal cassette; and causing a transport apparatus to initiate a transfer of one or more of the banknotes between the first universal cassette and the second universal cassette based on the information regarding the banknotes stored in the first universal cassette and the information regarding the banknotes stored in the second universal cassette, wherein the transport apparatus is disposed within a universal cassette housing, the universal cassette housing coupled to the first universal cassette and the second universal cassette.

19. The non-transitory computer-readable media of claim 18, wherein the operations further comprise:

receiving a rebalancing parameter comprising at least one of:

a geographical location of the universal cassette housing;

a destination of the first universal cassette;

a destination of the second universal cassette;

a time of day; or a projected demand of the banknotes.

20. The non-transitory computer-readable media of claim 18, wherein the operations further comprise:

causing the first universal cassette to dispense a first set of the banknotes, wherein the first set of the banknotes is received by the transport apparatus;

causing the second universal cassette to receive the first set of the banknotes from the transport apparatus causing the second universal cassette to dispense a second set of the banknotes, wherein the second set of the banknotes is received by the transport apparatus; and causing the first universal cassette to receive the second set of the banknotes from the transport apparatus.

* * * * *